(12) United States Patent
Allen et al.

(10) Patent No.: US 11,460,639 B2
(45) Date of Patent: Oct. 4, 2022

(54) WAVELENGTH SELECTIVE TRANSFER OF OPTICAL ENERGY

(71) Applicant: Lawrence Livermore National Security, LLC, Livermore, CA (US)

(72) Inventors: Graham S. Allen, Pleasanton, CA (US); Diana C. Chen, Fremont, CA (US); Matthew J. Cook, Brentwood, CA (US); Robert P. Crist, Tracy, CA (US); Derrek R. Drachenberg, Livermore, CA (US); Jay W. Dawson, Livermore, CA (US); Victor V. Khitrov, San Ramon, CA (US); Leily Kiani, Livermore, CA (US); Michael J. Messerly, Danville, CA (US); Paul H. Pax, Livermore, CA (US); Nick Schenkel, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/445,033

(22) Filed: Jun. 18, 2019

(65) Prior Publication Data
US 2019/0310420 A1 Oct. 10, 2019

Related U.S. Application Data

(63) Continuation of application No. PCT/US2017/067096, filed on Dec. 18, 2017.
(Continued)

(51) Int. Cl.
*G02B 6/293* (2006.01)
*G02B 6/30* (2006.01)

(52) U.S. Cl.
CPC ...... *G02B 6/29332* (2013.01); *G02B 6/29331* (2013.01); *G02B 6/29335* (2013.01); *G02B 6/30* (2013.01)

(58) Field of Classification Search
CPC .......... G02B 6/001; G02B 6/26; G02B 6/293; G02B 6/29302; G02B 6/29332;
(Continued)

(56) References Cited

U.S. PATENT DOCUMENTS

| 4,026,632 A | 5/1977 | Hill et al. |
| 4,483,583 A | 11/1984 | Unger |

(Continued)

FOREIGN PATENT DOCUMENTS

| JP | S53 137160 A | 11/1978 |
| JP | 2015 194585 A | 11/2015 |

OTHER PUBLICATIONS

Chen et al., "Design of add-drop multiplexer based on multicore optical fibers for mode-division multiplexing", Optics Express, vol. 22, No. 2, Jan. 27, 2014, 1440-1451.
(Continued)

*Primary Examiner* — Michael P Mooney
(74) *Attorney, Agent, or Firm* — Knobbe, Martens, Olson & Bear, LLP

(57) ABSTRACT

An all fiber wavelength selective coupler provides wavelength selective transfer of optical energy between two or more separated waveguides. The coupler includes signal cores that are separated enough that they can be fusion spliced to standard fibers as lead-in and lead-out pigtails. A bridge between the signal cores facilitates transfer of the optical energy through a process of evanescent coupling. In one example, the bridge is formed of a series of graded index cores.

55 Claims, 18 Drawing Sheets

Related U.S. Application Data

(60) Provisional application No. 62/436,338, filed on Dec. 19, 2016.

(58) Field of Classification Search
CPC ............ G02B 6/29331; G02B 6/29335; G02B 6/29395; G02B 6/30; G02B 6/12007; G02B 6/24; G02B 6/2938; G02B 6/29383; G02F 1/0115
USPC ............ 385/27–28, 30, 32, 39, 42, 50
See application file for complete search history.

(56) References Cited

U.S. PATENT DOCUMENTS

| | | | |
|---|---|---|---|
| 4,720,160 | A | 1/1988 | Hicks, Jr. |
| 4,759,596 | A | 7/1988 | Po et al. |
| 6,101,300 | A | 8/2000 | Fan et al. |
| 6,928,215 | B1 | 8/2005 | Lui et al. |
| 7,242,827 | B1 | 7/2007 | Bochove |
| 7,466,881 | B1 | 12/2008 | Fattal et al. |
| 7,876,495 | B1* | 1/2011 | Minelly ............ H01S 3/06737 359/341.1 |
| 10,033,148 | B2 | 7/2018 | Pax et al. |
| 10,348,050 | B2 | 7/2019 | Dawson et al. |
| 10,429,580 | B2 | 10/2019 | Zalevsky |
| 10,838,149 | B2 | 11/2020 | Drachenberg et al. |
| 2004/0175084 | A1 | 9/2004 | Broeng et al. |
| 2006/0029323 | A1 | 2/2006 | Nikonov et al. |
| 2006/0257071 | A1 | 11/2006 | Bise et al. |
| 2008/0273835 | A1* | 11/2008 | Popovic ............ G02B 6/12007 385/27 |
| 2009/0207483 | A1 | 8/2009 | Goto |
| 2010/0209038 | A1* | 8/2010 | Popovic ............ G02B 6/12007 385/1 |
| 2011/0142397 | A1 | 6/2011 | Vinayak et al. |
| 2011/0170821 | A1 | 7/2011 | Lipson et al. |
| 2011/0188825 | A1* | 8/2011 | Alkeskjold ...... B29D 11/00663 264/1.24 |
| 2011/1088825 | | 8/2011 | Alkeskjold |
| 2013/0039616 | A1 | 2/2013 | Shambat et al. |
| 2013/0089112 | A1 | 4/2013 | Dong et al. |
| 2013/0223791 | A1 | 8/2013 | Okayama |
| 2016/0266320 | A1 | 9/2016 | Li et al. |

OTHER PUBLICATIONS

International Search Report and Written Opinion for PCT/US2017/067096 corresponding to U.S. Appl. No. 16/445,033, 12 pages.

Supplemental European Search Report and Search Opinion, EP 17884879.2, 10 pages.

J.W. Dawson et al., "Analysis of the scalability of diffraction-limited fiber lasers and amplifiers to high average power," Opt. Express, vol. 16, No. 17, 13240-13266 (2008).

T. Eidam et al., "Experimental observations of the threshold-like onset of mode instabilities in high power fiber amplifiers," Opt. Express, vol. 19, No. 14, 13218-13224 (2011).

Y. Lu et al., "Gain Flattening by Using Dual-Core Fiber in Erbium-Doped Fiber Amplifier," IEEE Photonics Technol. Lett., vol. 12, No. 12, 1616-1617 (2000).

Y. Lu et al., "A gain-flattened L-band dual-core erbium-doped fibre amplifier," Optics Communications, vol. 220, 303-308 (2003).

B.A. Malomed et al., "Nonlinear-optical amplifier based on a dual-core fiber," Optics Letters, vol. 21, No. 5, 330-332 (1996).

B. Wu et al., "A twin-core erbium-doped fiber amplifier," Optics Communications, vol. 110, 545-548 (1994).

* cited by examiner

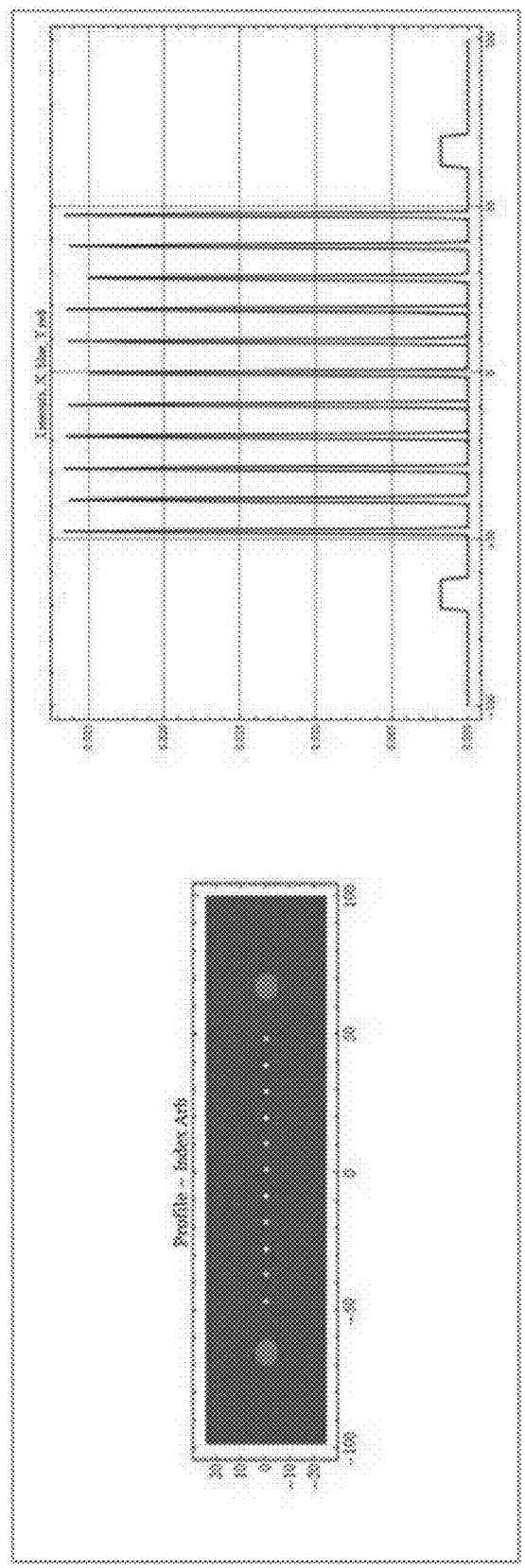

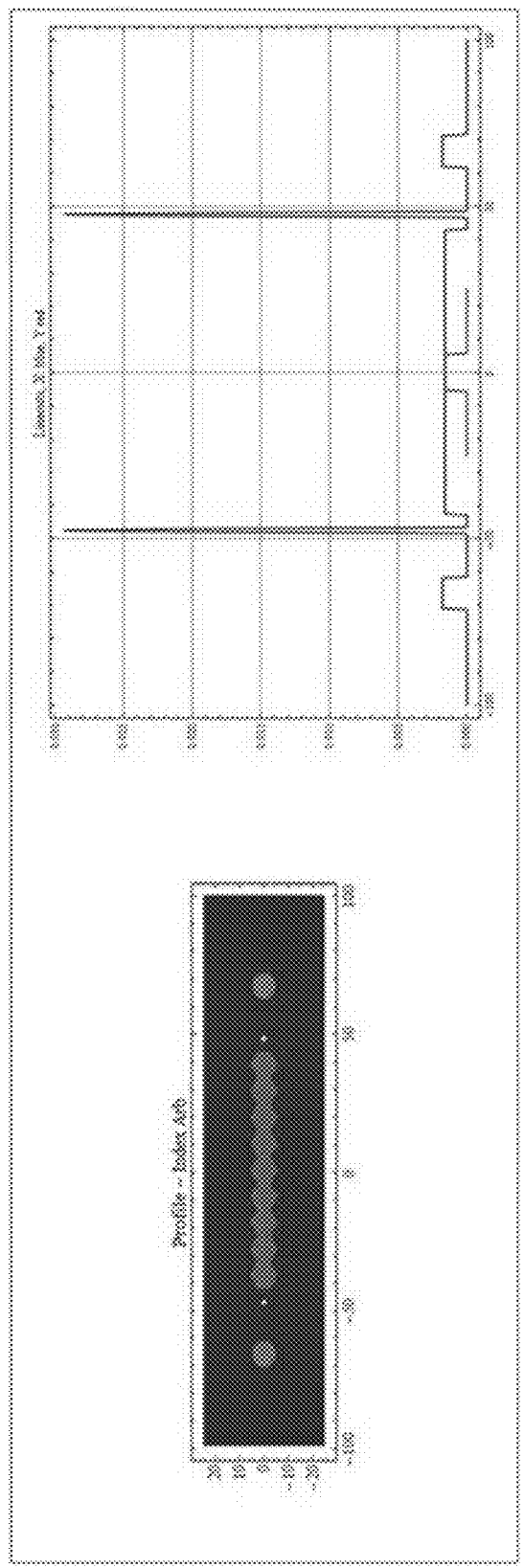

WAVELENGTH SELECTIVE TRANSFER OF OPTICAL ENERGY

CROSS-REFERENCE TO RELATED APPLICATIONS

This application is a continuation of International Application Number PCT/US2017/067096 titled "Wavelength Selective Transfer of Optical Energy" filed Dec. 18, 2017, incorporated herein by reference, which claims the benefit of U.S. Provisional Patent Application No. 62/436,338 titled "Apparatus and Methods for the Wavelength Selective Transfer of Optical Energy Between Two or More Separated Waveguides," filed Dec. 19, 2016, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND OF THE INVENTION

Field of the Invention

The present technology relates to techniques for transferring optical energy from one waveguide to another, and more specifically, it relates to apparatuses and methods for wavelength selective transfer of optical energy between two or more separated waveguides.

Description of Related Art

An all-fiber coupler that will operate at high power without the need for heavy tapering or specialty lead-in/lead-out fibers is desirable. It is also desirable that the all-fiber coupler be wavelength selective in order to combine light of two or more distinct wavelengths. The coupler should be able to perform conversion to or from high order modes in few-moded or multimoded optical fibers.

Previously, free space excitation with phase masks, spatial light modulators, or fiber Bragg gratings have been employed to accomplish fiber mode conversion. The desired approach should be much more flexible and robust and add spectral selectivity. Commercially available options are unacceptable because they rely on heavily tapered fibers which are not robust at high power. The alternative is to place two untapered waveguide cores close to each other in the same fiber which would facilitate coupling, but in this case non-standard (D-shaped) fiber pigtails would be necessary to fusion splice on to each end to separate the two input cores, and standard fibers could then be spliced to the D-fibers. This involves many splices, each of which is a potential failure point and is labor intensive. The previously mentioned methods are also not inherently wavelength selective, as the beams in each core will oscillate back and forth many times before settling in to one of the cores together. See U.S. Pat. No. 8,406,594. Of further interest may be "Design of add-drop multiplexer based on multicore optical fibers for mode-division multiplexing", Chen et al., Optics Express, Vol. 22, No. 2, 27 Jan. 2014, 1440-1451

Thus, there is a need in a variety of applications for the transfer of optical power between two or more separated waveguides without significant tapering of the cores and with the ability to fusion splice standard fibers to each port. Existing commercial waveguide couplers rely on either coupling of the evanescent fields of the supported modes between two nearby waveguides or micro-optic systems. In the evanescent coupling case, the waveguides must be sufficiently close to each other that the evanescent field in one waveguide appreciably reaches the waveguide in which coupling is desired. Two ways to accomplish this are to put two untapered waveguides very close to each other within the same waveguide, or to taper the waveguides to such a small diameter that the supported modes expand and reach the nearby waveguide for coupling.

SUMMARY OF THE INVENTION

The present technology uses a wide slab type core or a series of smaller step index or graded index cores between the two primary cores to selectively transfer light between cores within a spectral wavelength band. Only one wavelength from one core will transfer to the other core. The second wavelength will not undergo any transfer. By separating the cores with a series of graded index cores, the present technology also enables the use of standard off the shelf fiber (e.g., a 125 μm fiber) to be spliced to the ends of the coupler, due to the ability to arbitrarily separate the coupling cores. That is, a key feature of the present technology is the ability to spatially separate cores while maintaining strong optical coupling between them (at least at some wavelengths). In a multimode version of this coupler, a single mode out of the available modes can be selected for transfer. The input core can be single or multimode and the output core can be single or multimode, but only one mode will be selected for transfer.

Unlike any previous method, the present technology employs auxiliary cores between the two waveguides for which coupling is desired. A principle advantage is that the separation between the coupled cores can be designed to be larger than would otherwise be possible while maintaining large core sizes (without significant tapering). Standard fibers which have ~125 μm diameters can then be spliced directly to the ports on either end of the coupler, which is not possible with direct coupling between two closely spaced cores. Additionally, the coupling behavior of the present technology is wavelength selective, and therefor can be used to combine beams of differing wavelengths. Such coupling can be between two cores, or from one core to many, or from many cores to one. The coupling behavior is also modally selective. Any single mode in a multimode waveguide can be extracted or excited by this method.

The auxiliary cores could be made in a variety of ways. Exemplary embodiments include a series of identical high dispersion single or multimode cores. Other exemplary embodiments include a large slab multimode core and additional high dispersion single or multimode cores.

The present technology has many uses, including wavelength division multiplexing (WDM) of lasers at low or high power (high power is challenging for commercially available techniques). WDM can be between only two cores, or from multiple cores to one. Other uses include beam splitting from one to several cores and beam combining from several cores to one (spectral or coherent). Additional uses include exciting high order modes, which can be used for orbital angular momentum (OAM) mode excitation. This technology can also be used for converting to or from high order modes in an amplifier. These uses are exemplary. Based on the teachings herein, other uses will be apparent to those skilled in the art.

BRIEF DESCRIPTION OF THE DRAWINGS

The accompanying drawings, which are incorporated into and form a part of the disclosure, illustrate embodiments of the present technology and, together with the description, serve to explain the principles of the invention.

FIG. 4A shows the GRIN bridge approach geometry.

FIG. 4B shows the relative refractive index for the GRIN bridge approach geometry of FIG. 4A.

FIG. 6A shows the slab/GRIN hybrid geometry.

FIG. 6B shows the relative index of refraction of each element of FIG. 7A

DETAILED DESCRIPTION OF THE INVENTION

Figure 1:
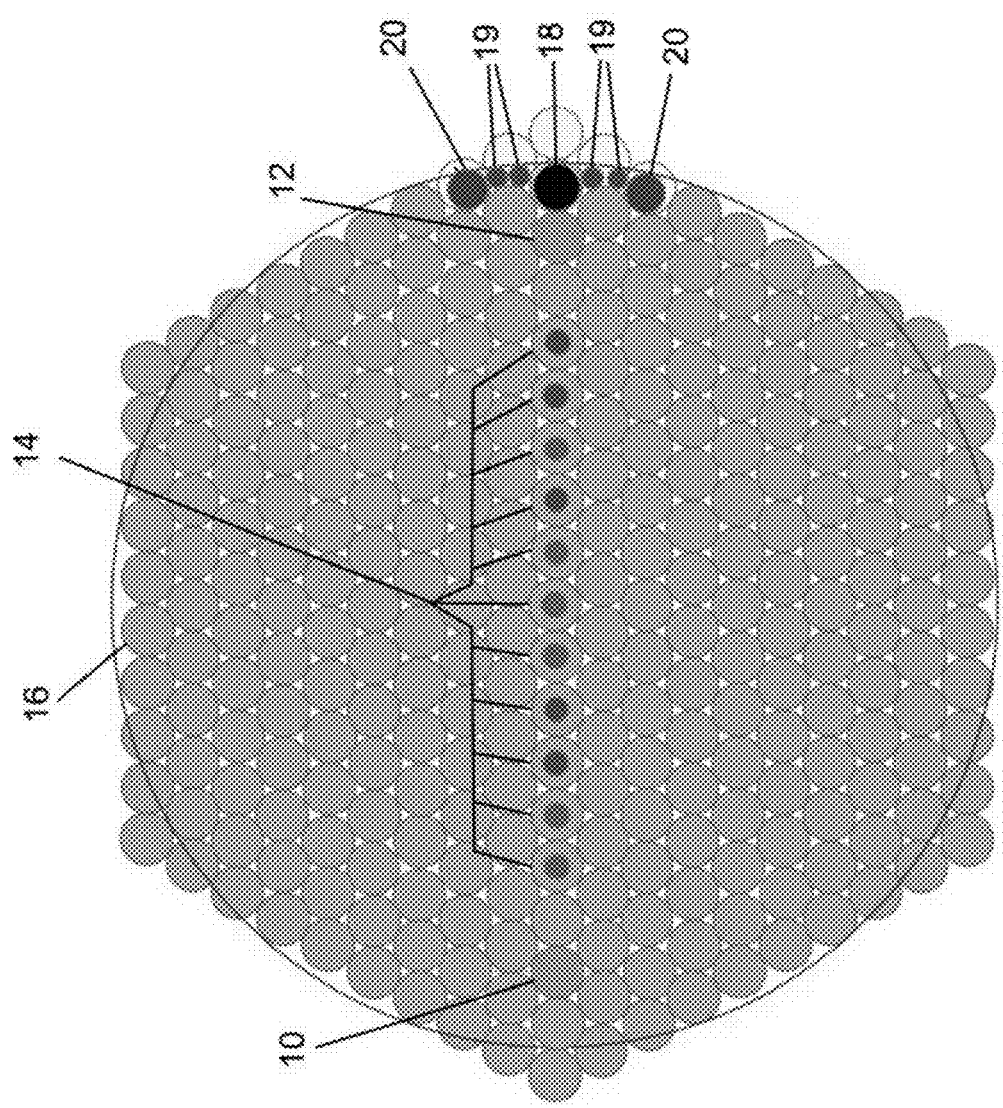
FIG. 1 shows a cross-section of a stack design for wavelength selective all-fiber coupler.

Embodiments of present technology include an all fiber wavelength selective coupler with cores that can be separated enough to fusion splice standard 125 μm fibers as lead-in and lead-out pigtails. FIG. 1 shows a cross-section of a stack design for an example of such a coupler. This is an example of how the stack is formed in preparation for the fiber pull. Cores 10 and 12 on either side of the stack are the primary waveguides (e.g., Ge-doped step index cores) that are to be coupled, and the series of 11 cores 14 are the graded index (GRIN) rods that act as a resonant bridge between the two cores. In this example, the canes 16 and the cores 10 and 12 are have a relative diameter of 1 unit. The GRIN cores 14 will typically have a relative diameter of less than 1 unit, but are embedded in a cane of diameter of 1 unit by surrounding the GRIN with pure silica. The figure shows how the stack is formed to produce a round cross-section. The canes 18, 19 and 20 are provided to smooth the corners of the hexagonal structure. In this example, cane 18 has a relative diameter of 0.9 units. Canes 19 have a relative diameter of 0.4 units and canes 20 have a relative diameter of 0.75 units. Canes 16 and 18-20 are formed of $SiO_2$. The figure shows the configuration that is used to round one of the corners of the hexagonal structure. The actual stack uses the same configuration at all corners of the hexagon.

The GRIN rods individually support at least two modes. One critical design feature of the present technology is that the effective index of the fundamental mode in the signal cores must match one of the modes (the second mode in this case) of an individual GRIN core. The second mode was chosen because it has higher dispersion than the first mode, and therefore a narrower resonance. Other versions of this design use the first mode. The GRIN cores exhibit relatively high dispersion as compared to that of the step index signal core, so the effective index can only match for a relatively narrow wavelength band. The coupling efficiency and the length at which maximum coupling occurs can be optimized by tuning the spacing between each GRIN core and between the set of GRIN cores and the signal cores independently. In one example, in which the second mode of each GRIN is used, the separation between GRIN cores are kept to approximately 3.9× the core diameter, while the signal cores are placed twice as far from the nearest GRIN by leaving a silica spacer in between. Maintaining a close spacing between the GRIN cores causes splitting of the supermode effective indices. Since the supermode effective indices are clustered around that of a single GRIN, several of the supermodes may participate in the coupling, complicating the coupling behavior by multimode interference (MMI). Splitting of supermode effective indices may be used to restrict the number of supermodes participating in the coupling. Close spacing between cores allows coupling directly to supermodes that span the entire bridge rather than into each core in a sequence and represents an instantaneous transfer across the bridge. Leaving additional space between the bridge and the second signal core allows tuning of the transfer speed. An optimized design causes the mode to couple at a moderate rate into substantially a single supermode of the GRIN core set which spans the entire bridge simultaneously, and finally arrives at the far signal core and transferring into that core at a moderate rate. The desired rate of transfer from input core to output core depends on the specifics of the desired application. In the described case, a complete transfer in 100-300 mm can be made. In this case, for a given design, a wavelength can be found such that the signal completely transfers from one core to the other but only within the desired wavelength band, leaving all other wavelengths in place. In an example of an implementation of FIG. 1, the pitch between elements is 9 μm, the signal cores have a diameter of 9 μm with a numerical aperture (NA) of 0.072, and the GRIN diameter of 2.3055 μm with a peak NA of 0.3.

Another embodiment of this concept employs a large slab with high dispersion GRINs on either side of the slab in a hybrid approach. In this hybrid approach, a slab provides the long bridge through which the power can pass while the high dispersion GRINs on either side provide the wavelength selectivity. While the slab supports multiple modes, their effective indices are widely spaced as compared to those of the supermodes of the GRIN based approach discussed above. Because of this wide spacing, only a single mode of the slab participates in the coupling between signal cores, substantially simplifying the coupling behavior. This approach is appreciably broader band (3-10% bandwidth) than the original approach (1-3% bandwidth).

Figure 2A:
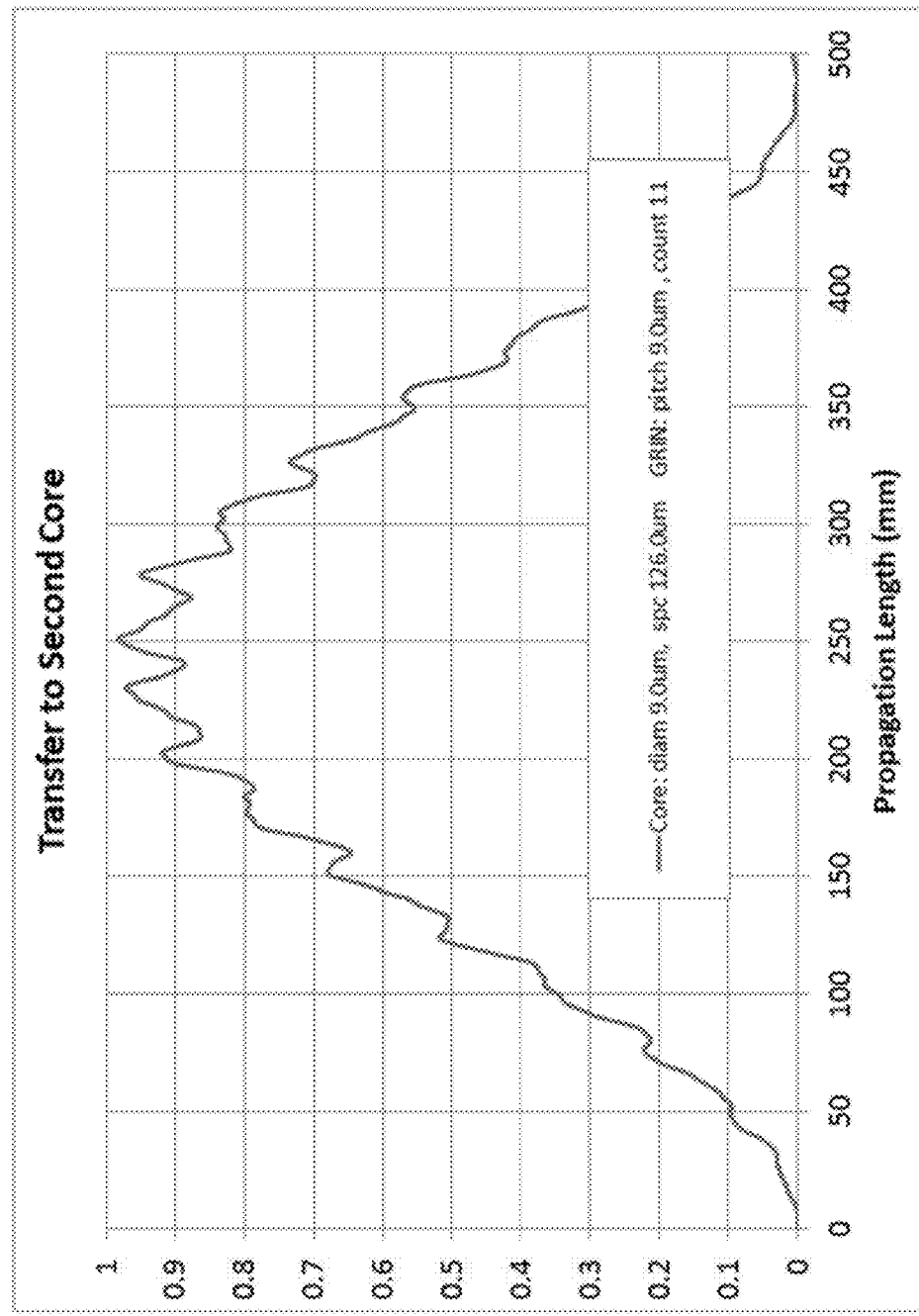
FIG. 2A shows 1-D BPM transfer ratio vs coupler length at 1178 nm.
Figure 2B:
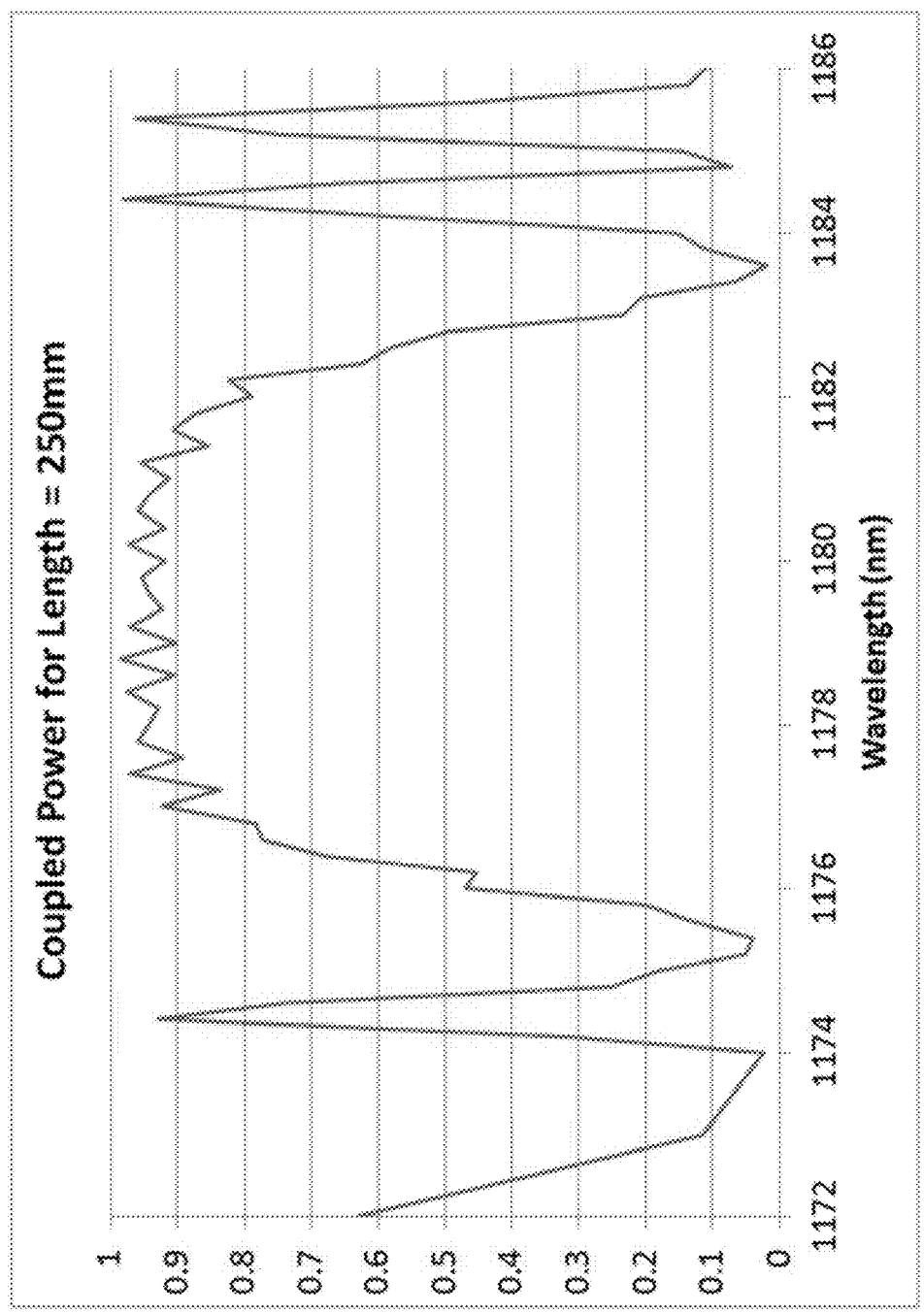
FIG. 2B shows transfer ratio vs wavelength at 250 mm length.

Using a Coupled Mode Theory (CMT), the performance of a completed waveguide embodiment that began with the structure of FIG. 1 was calculated. FIG. 2A shows the transfer performance of the coupler as a function of coupler length. FIG. 2B shows the transfer performance of the coupler as a function of wavelength. Both the ideal length and the bandwidth can be controlled by adjusting the design of the structure of FIG. 1. The ideal coupler length in this case is 250 mm for a wavelength of 1178 nm.

Figure 3:
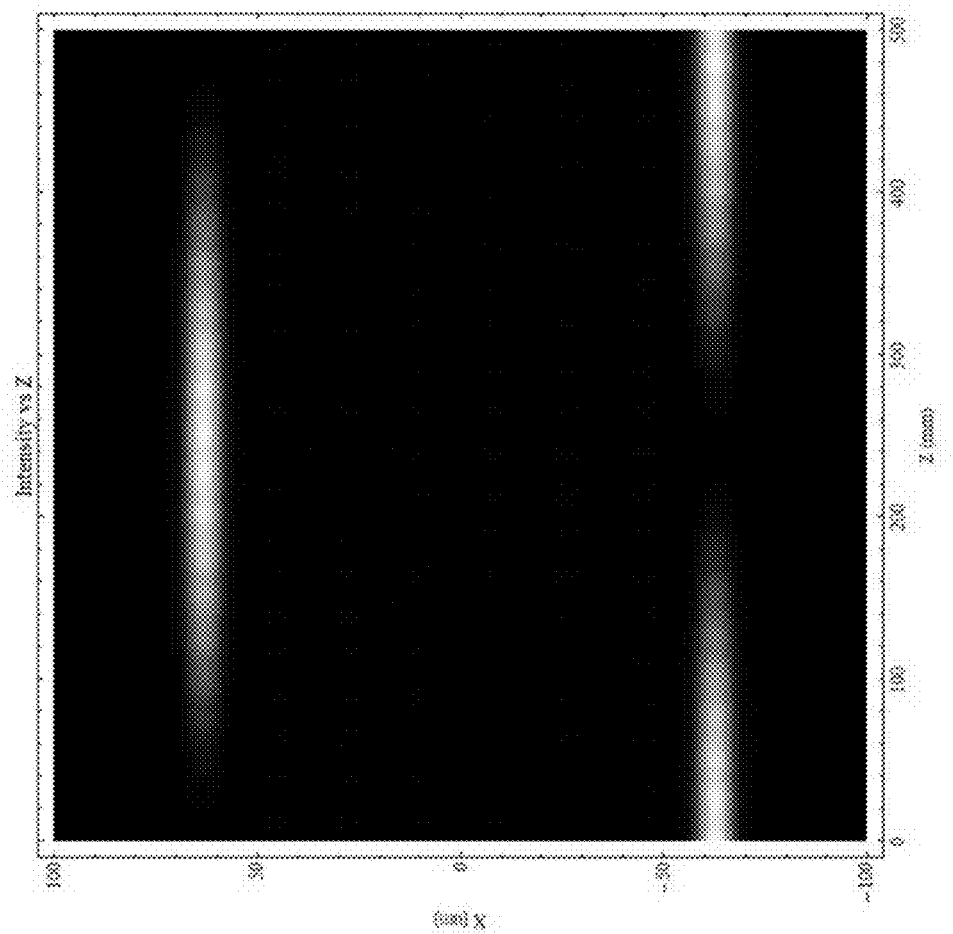
FIG. 3 shows 1-D BPM results for intensity across the waveguide structure of FIG. 1.

FIG. 3 shows results for intensity across the waveguide structure of FIG. 1. Propagation is from left to right. While there is intensity in the GRIN cores, it is too low to be seen without a log plot. This is a result of the close spacing of the grin cores facilitating fast transfer across to the signal core.

Commonly owned with the present technology are U.S. patent application Ser. Nos. 15/288,590 and 15/288,810, both incorporated herein by reference. These two applications teach filtering out light from a waveguide core into a pump cladding reservoir. A train of GRIN cores reaching from adjacent to the signal core to the outer pump cladding match the effective index at an undesired wavelength and the light is then deposited into a highly multimode pump cladding reservoir. A structure was desired that could achieve complete transfer from one single mode core to another single mode core. It was thought that once transfer was made to the GRIN cores that the power might simply smear out between all the cores without a cladding reservoir to be deposited into. The key insight was realizing that a slow transfer to the GRIN cores from the signal cores (by a large gap) and a fast transfer between the GRIN cores enabled relatively smooth and complete coherent transfer between the two signal cores. The breakthrough came as a result of using the original/existing insight that light could be coupled out of a signal core into a series of GRIN cores for specific wavelengths, and adding new insights that 1) the transfer maintains coherence over several cores, and that 2) a disparity in coupling strength between the core types can create the desired transfer effect.

The rate of transfer between the signal cores and the GRIN bridge can be tailored to the desired application. The result of additional separation is a longer coupler. Closing the spacing between each GRIN causes greater separation of the effective indices of the supermodes. This ideally causes the light to couple into a supermode which simultaneously spans the entire bridge and therefore is available to transfer to the second signal core immediately.

The GRINs should ideally be close enough to substantially lift the degeneracy of the supermodes, favoring the participation of just one of them. The signal core separation can be tailored for the application and desired coupling length. If the optimization is not done well, multi-mode interferences (MMI) can result and the light can partially transfer to the cross port then partially return and repeat in a cycle that is not a smooth transfer from one to the other. In this case, it may not reach full transfer at the desired length.

One feature of the present technology uses evanescent coupling to create a coupler between two waveguides, in contrast to the goal of referenced 'filtering fiber' patent applications (U.S. patent application Ser. Nos. 15/288,590 and 15/288,810). The problem of dumping light from a core to a sink is inherently simpler than the problem of reconstructing the light into a second core. The requirements on a bridge to dump the light are simply that the effective indices of one or more of the bridge modes overlaps with the core mode. The sink does not need to be carefully matched because the transferred light does not need to collect into a single mode there leaving none in the core. To couple to a second core, both cores must be carefully matched to a single or a set of bridge modes, and the rate of transfer must be considered because once full transfer is complete, it would begin to return to the original core.

The scheme can be expanded to 1 or more additional cores (a pathway from 1 to 6 is straightforward given the hexagonal symmetry of the stack and draw process). The multiple core couplers may be optimized for different wavelength bands. This scheme can be polarization as well as wavelength sensitive. Thus, the present technology enables a new type of polarizing optical fiber. In the multicore case, the generation of radial or azimuthally polarized fiber modes is enabled. This technology is useful for ribbon fiber mode conversion. It allows for cores to be different in size/mode field diameter, particularly central core. The geometry has useful chromatic dispersion properties. In an asymmetric coupler, one core can be single mode while the second is multimode. The coupler can excite one high order mode in the multimode core from the single mode core, or the single mode core can be excited by a high order mode in the multimode core. Further, in a symmetric coupler, both cores can be multimode, and one fundamental or high order mode in one core can excited the same as or different from a fundamental or high order mode in the second coupler. The "bridge" between the signal cores could be made from a slab with a single GRIN on either side. The initial GRIN string concept provides a very narrowband wavelength range for operation±1-3% while the slab/hybrid approach provides a broadband window of operation±3-10%. A broadband coupler could be desirable for broadband laser coupling.

FIG. 4A shows a GRIN bridge approach geometry. The outermost waveguides are signal cores. The inner 11 "small" elements are high dispersion GRINs.

FIG. 4B shows the relative refractive index for the GRIN bridge approach geometry of FIG. 4A.

Figure 4C:
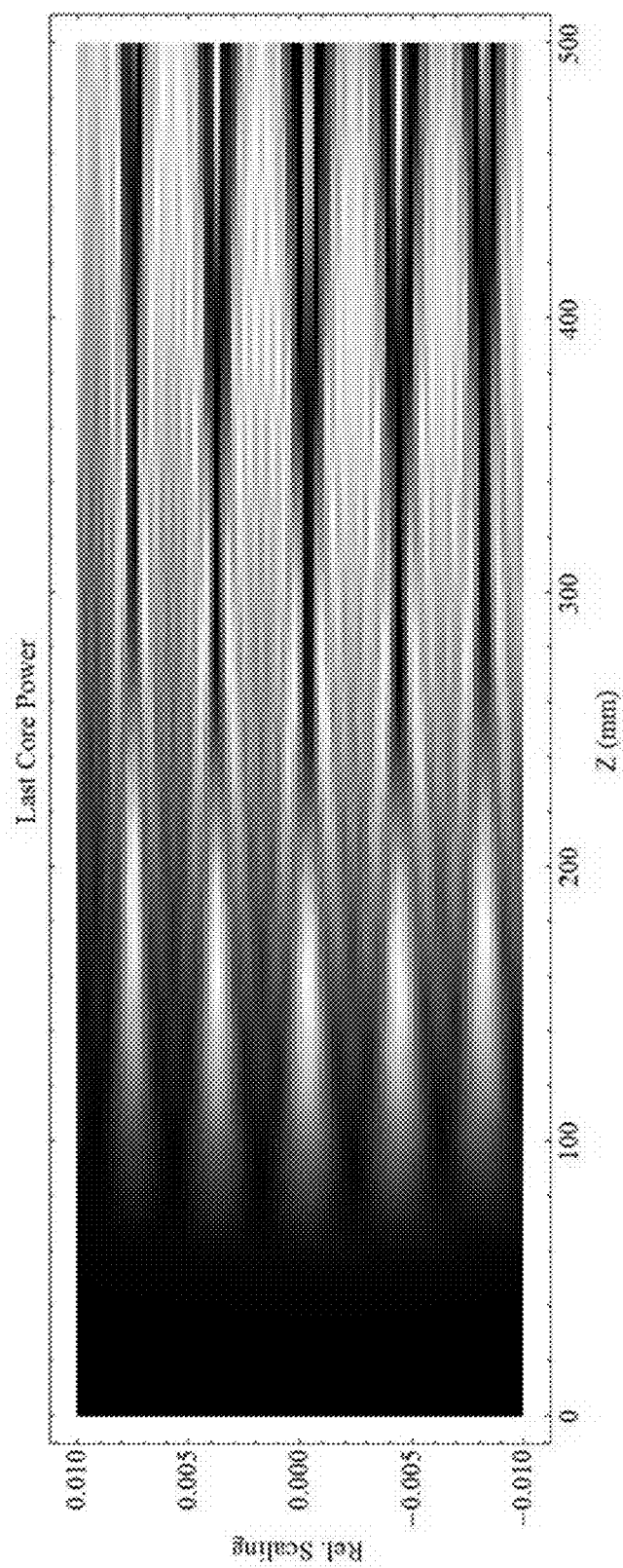
FIG. 4C shows a plot of the coupling efficiency into the second core of FIG. 4A as a function of length, as calculated by Coupled Mode Theory (CMT).
Figure 5A:
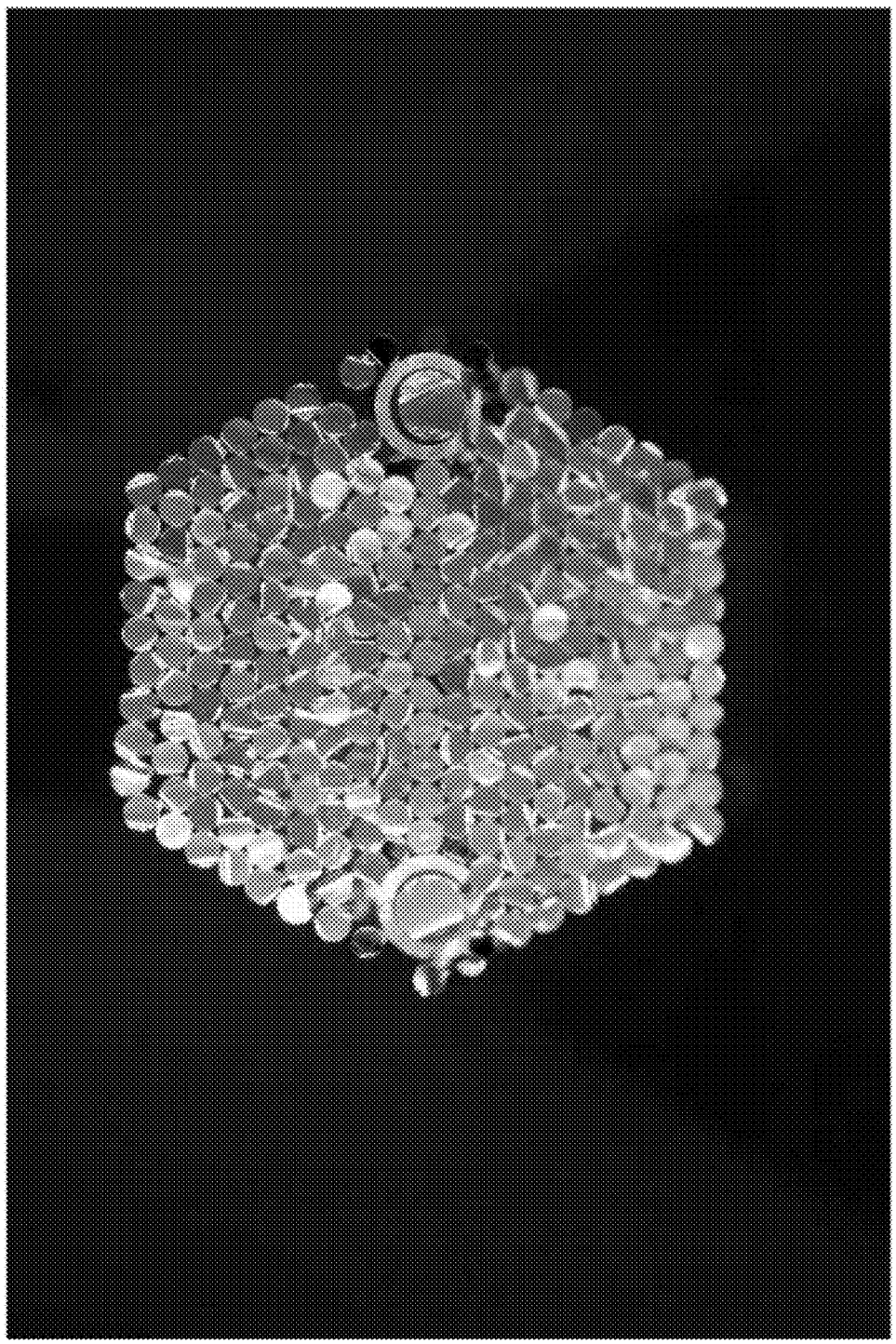
FIGS. 5A-D show fabrication images of embodiments of the present invention
Figure 5B:
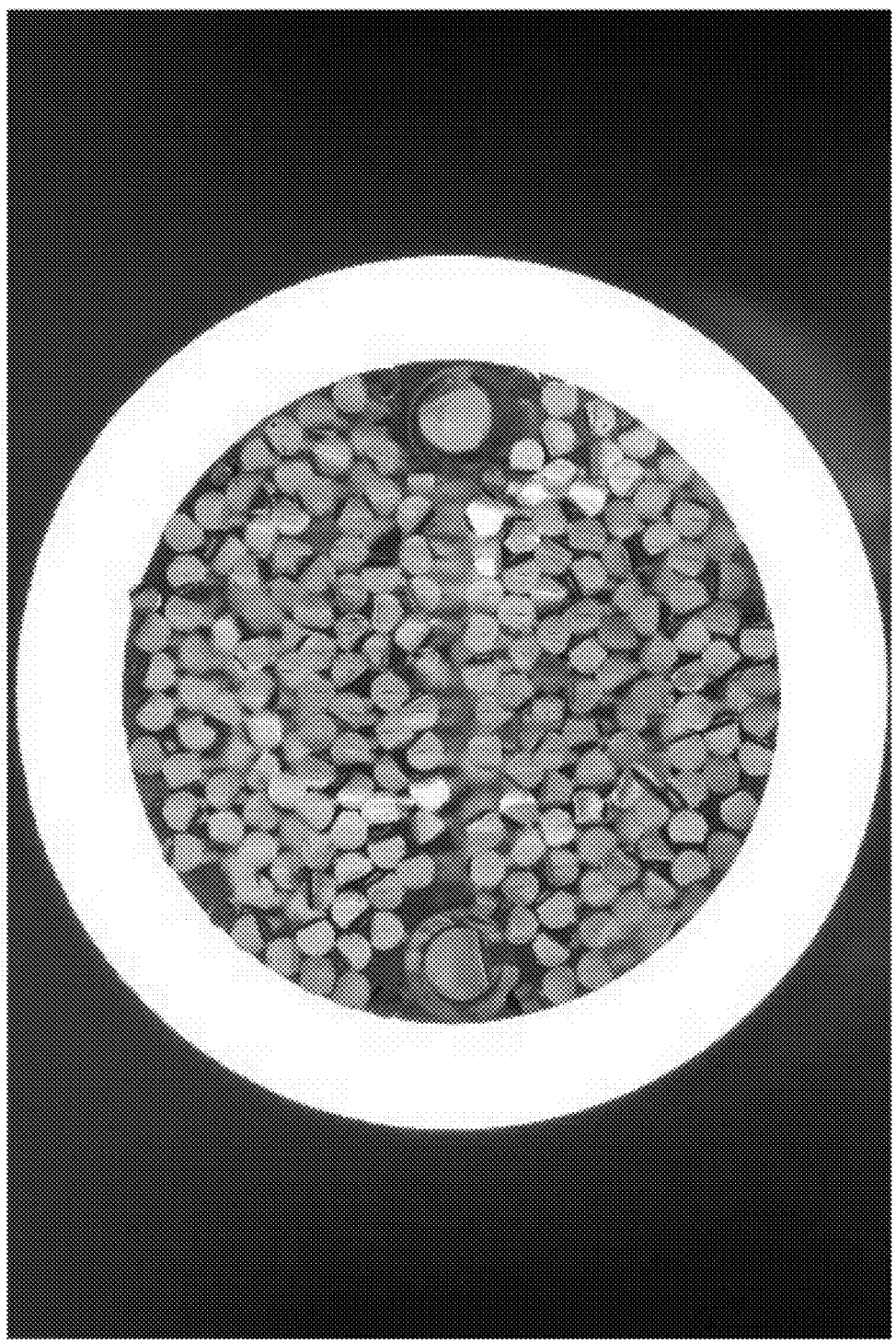
Figure 5C:
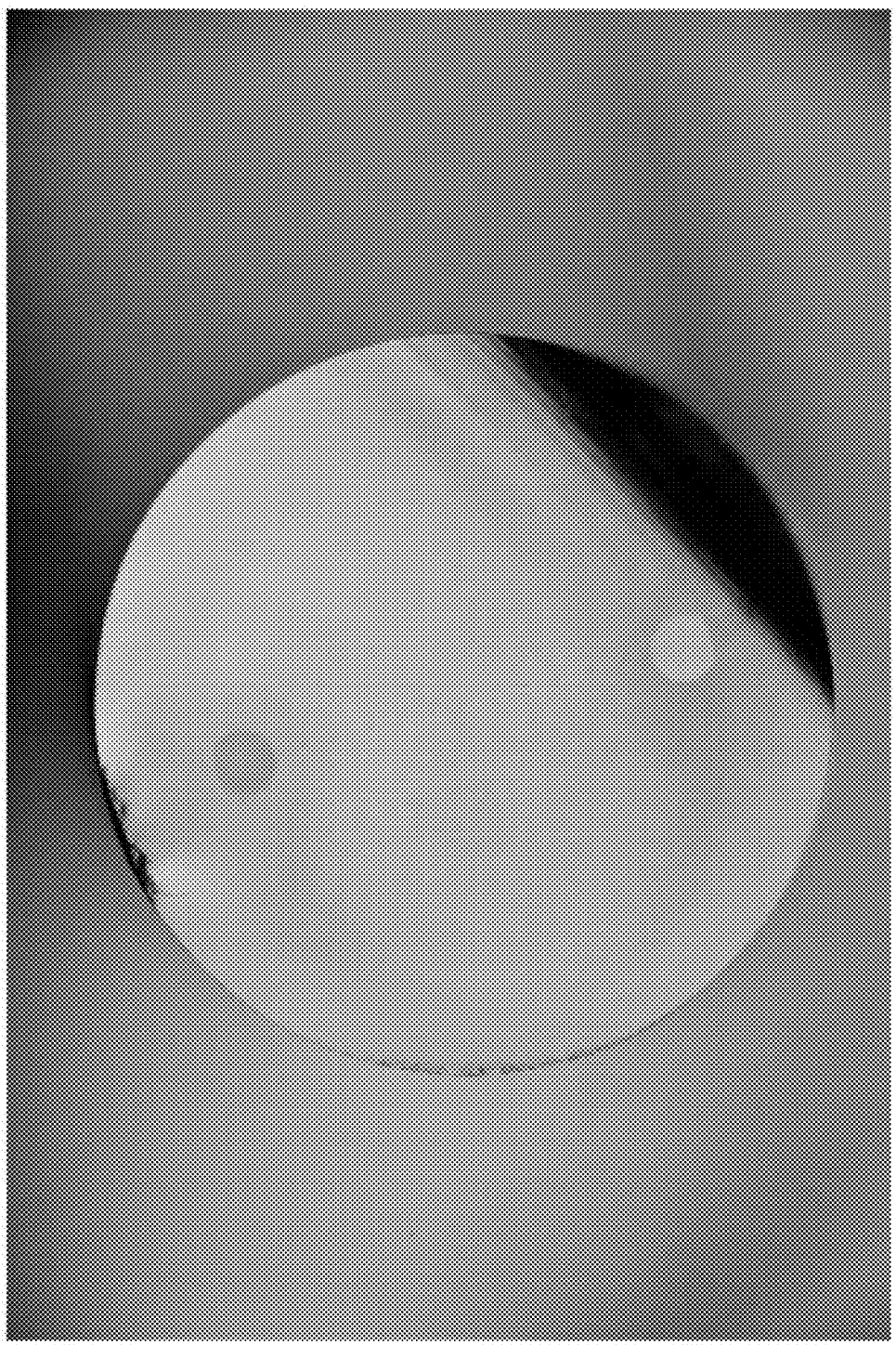
Figure 5D:
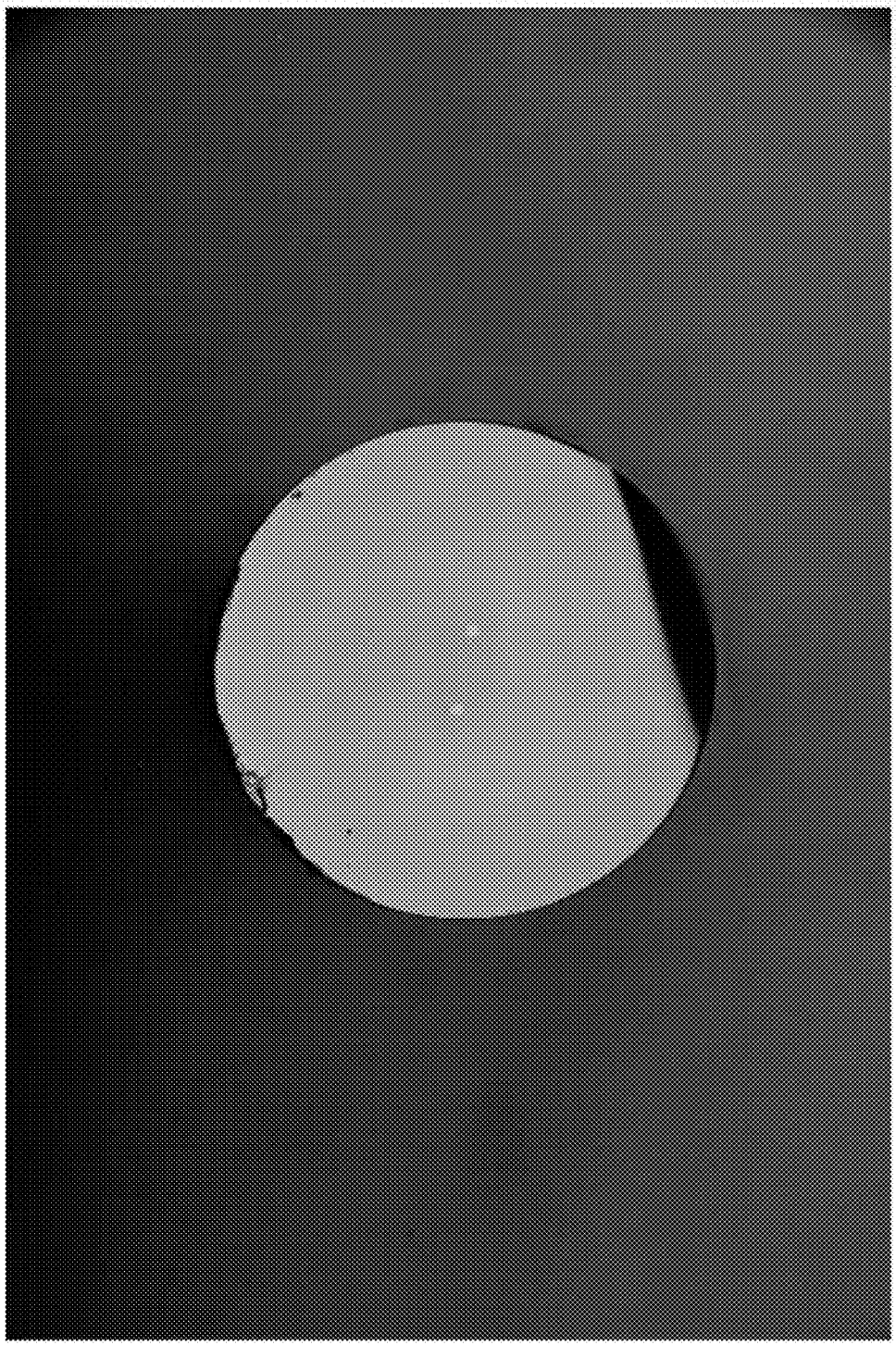

FIG. 4C shows a calculated plot of the coupling efficiency into the second core of FIG. 4A as a function of length. The coupling efficiency into the second core as a function of length is represented in the horizontal aspect and the relative scaling is represented in the vertical aspect. Relative scaling is equivalent to scaling in either wavelength or diameter of the final device. This plot was made with a coupled mode theory (CMT) model which can be used for the design of these devices. This shows the low bandwidth of this approach as compared to the Slab/GRIN-hybrid approach.

The specifications and design parameters for the fibers of FIG. 4A are as follows. The device is designed for a wavelength=1178 nm, $n_{silica}$=1.448275, pitch=10.5 µm, GRIN count=11. The step index cores are designed to have a diameter=20 µm, a NA=0.072, $\Delta n$=1.7886×10$^{-3}$ and a separation=147 µm. The GRINs have a diameter=1.884 µm (Single Mode), a diameter/pitch=0.1794, a NA=0.3 and a $\Delta n$=3.0745×10$^{-2}$.

FIGS. 5A-D show fabrication images of embodiments of the present technology.

Recent measurements on embodiments of the present technology show strong coupling around 1152 nm with >80% coupling and zero coupling at 1140 nm. This demonstrates the narrowband behavior that was expected from the modeling above. Greater than 90% coupling is possible with some small optimizations.

FIG. 6A shows the slab/GRIN hybrid geometry. Each outer core is a signal core. The next small cores are high dispersion GRINs, and finally the slab is in the center.

FIG. 6B shows the relative index of refraction of each element of FIG. 7A.

Figure 6C:
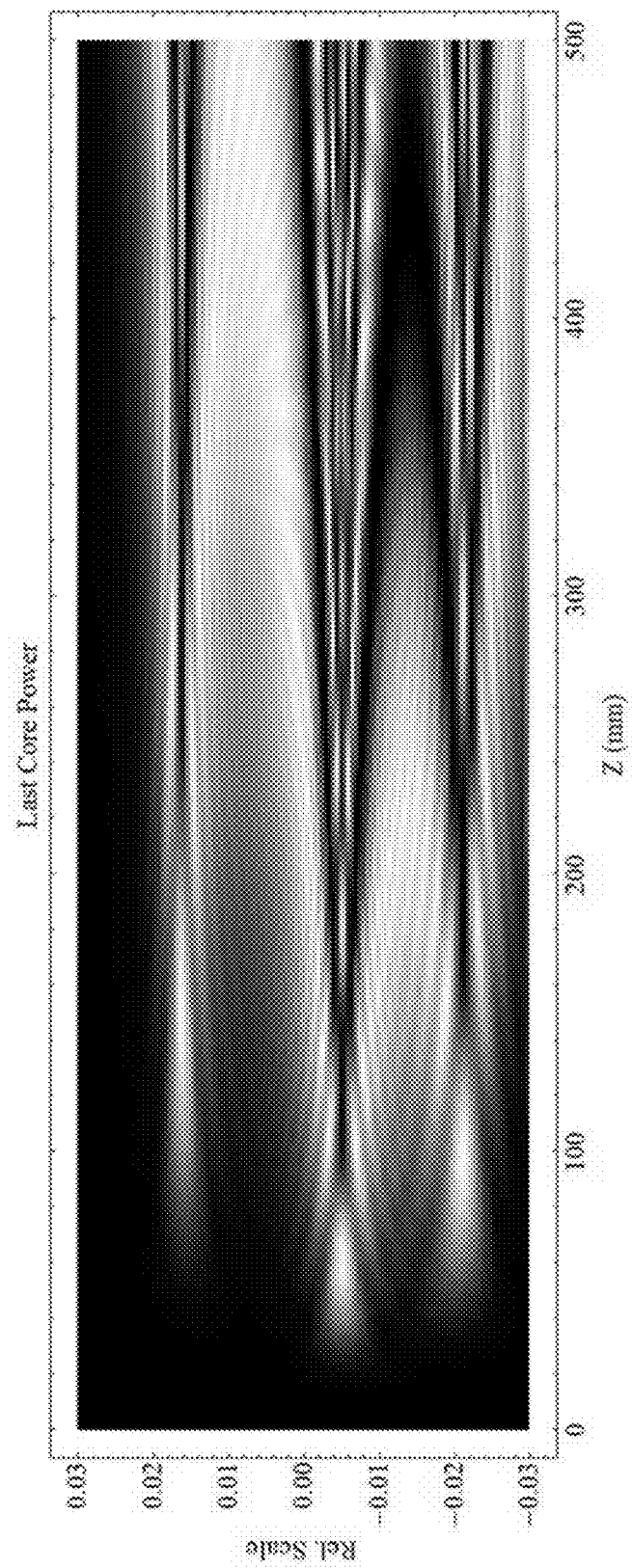
FIG. 6C shows a plot of the coupling efficiency into the second core of FIG. 6A with variation in either wavelength or fabrication diameter, as calculated by CMT.

FIG. 6C shows a calculated plot of the coupling efficiency into the second core of FIG. 6A with variation in either wavelength or fabrication diameter.

The plot shows the coupling efficiency into the second core with variation in either wavelength or fabrication diameter. The plot was made with a coupled mode theory (CMT) model which is used for the design of these devices. This shows the high bandwidth of this approach as compared to the original GRIN approach.

The specifications and design parameters for the embodiment of FIG. 6A are as follows. The device is designed for a wavelength=1178 nm, $n_{silica}$=1.448275, a pitch=10 µm, GRIN count=2 and a HEX count=9. The step index cores have a diameter=20 µm, a NA=0.072, a $\Delta n$=1.7886×10$^{-3}$ and a separation=140 µm. The GRINs have a diameter=1.884 µm, a diameter/pitch=0.1794, a NA=0.3 and a $\Delta n$=3.0745×10$^{-2}$. The HEXs have a width=pitch, a NA=0.095 and $\Delta n$=3.1124×10$^{-3}$.

Thus, in embodiments of the present all-fiber WDM coupler for high power, the signals are either coupled between two waveguides, or not, depending on wavelength. The waveguides are 15-30 µm in diameter, to accommodate high optical powers in the range from 100 W to 1000 W. The waveguides are greater than 125 µm apart to facilitate fusion splicing to standard 125 µm diameter fiber pigtails. Or, greater than 400 µm apart to facilitate fusion splicing to standard 400 µm diameter fiber pigtails. Generally, the cores must be as far apart as the diameter of the fibers that will be used as pigtails.

The present technology makes use of evanescent coupling between waveguides. In a typical case of identical waveguides, this effect requires the waveguides to be in close proximity, and is only weakly wavelength dependent. To increase the span between waveguides and to make the coupling more sensitive to wavelength, this technology introduces auxiliary dispersive waveguiding elements between them, resulting in a compound waveguide structure. Hereafter, the two original elements are referred to as the 'signal' waveguides, and the auxiliary elements as 'bridge' waveguides.

To satisfy the requirements of a high-power fiber WDM coupler, the following conditions must be met. The first condition is that the signal waveguides must support a mode with a large area, typically of diameter 20 µm but as low as 15 µm and as high as 40 µm; note that they need not be single mode. The second condition is that the bridge elements must support a separation between the signal elements of at least the diameter of the pigtail fibers. A typical pigtail diameter is 125 µm, but could also be between 80 µm and 400 µm. A third condition is that the bridge elements must be dispersive enough that there is sufficient differentiation of the net coupling between the signal waveguides at the wavelengths of interest.

The first condition can be satisfied simply by using a large diameter (20 µm), low NA (0.06 NA) core. The second condition can be satisfied by using wide bridge elements, or a string of smaller bridge elements. A wide bridge element would consist of a waveguide which has an aspect ratio of greater than 1 where the larger aspect stretches between the two cores and not orthogonal to them, providing a separation between the signal elements. A string of smaller bridge elements consists of a set of waveguides with aspect ratio of 1 and are placed in a string between the two signal cores to provide the desired separation from one signal core to the other. The number of waveguides depends on the required separation between the signal elements. To satisfy the third condition, elements are included in the bridge that are small in spatial extent as compared to the signal elements and have high NA as compared to the signal elements, causing the modes they support to have effective indices that are relatively sensitive to wavelength; that is, these elements have high dispersion relative to other elements in the structure.

The exact size and NA of these bridge elements depends on phase matching the mode in the bridge to the mode in the signal core. This is done by calculating the effective index of the desired signal element mode, and adjusting the NA and size of the bridge element until the desired bridge mode matches that of the signal core. Every bridge element, whether aspect of 1 or of greater than 1, must have a mode that is matched to a desired mode in the signal element. In the case of the high aspect bridge element, multiple modes will be present, and a single high order mode can be chosen as the matching mode. In the case of the bridge elements with aspect of 1, it can be single or multi-mode, and either the fundamental mode or a high order mode can be chosen. Whatever mode is chosen, the mode effective index must be matched to that of the signal core mode by adjusting the size and NA of the element.

The spacing between each bridge element and the spacing between the set of bridge elements and the signal elements can be adjusted independently to optimize the transfer length, rate and smoothness. The transfer between the input (or through) port and the output (or cross) port can be complex, exhibiting local maxima and local minima in addition to the overall transfer trend, due to multi-mode interferences (MMI). As discussed above, a Coupled Mode Theory (CMT) model has been used to numerically investigate, design and optimize various coupler structures. Following are some potential embodiments that satisfy the requirements. The elements of these embodiments are embedded in a glass background that constitutes the body of the fiber. The outer jackets are not shown. The overall cross-sectional shape is often round but the technology applies to other cross-sectional shapes as well.

Figure 7:
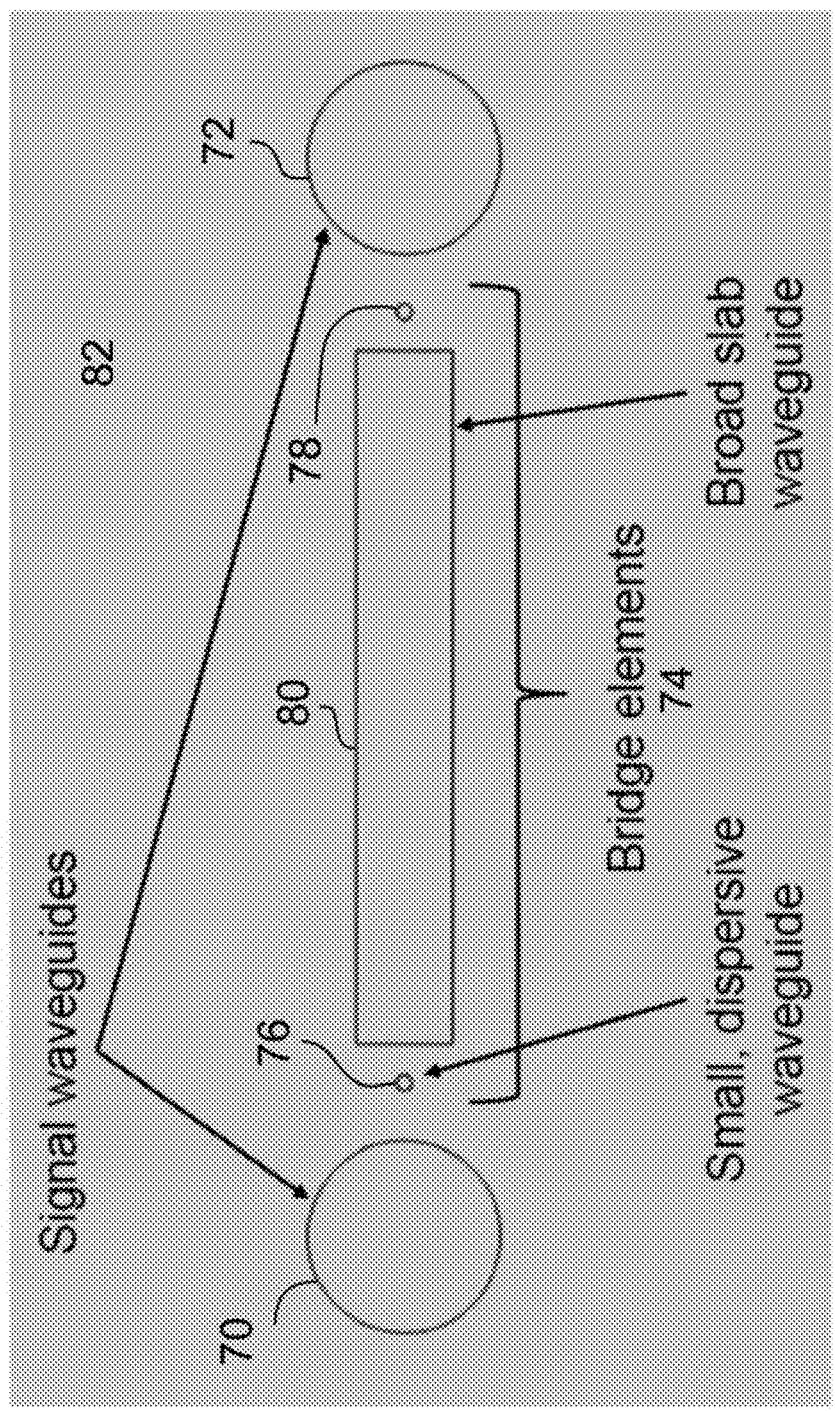
FIG. 7 shows a simple arrangement of the present technology having the minimum conceptual elements.

The embodiment of FIG. 7 is a simple arrangement having the minimum conceptual elements. All elements have a refractive index contrast with respect to the background (specified by NA), and each type of element typically has its own value of index. In particular, the dispersive elements will typically be high NA as compared to the signal elements. Fabricating the large signal elements 70 and 72 and bridge slab elements 74 with the required index uniformity is possible, but may be difficult or expensive. The refractive index profiles of the elements 74 may be uniform (step index) or may be tailored, for instance they may be so-called Graded-Index (GRIN) profiles. In this embodiment, the bridge slab element 74 consists of two small, dispersive waveguides 76 and 78 and a broad slab waveguide 80, and together will typically support several widely spaced modes, but only one of these will couple to the signal elements and participate in the transfer between them. This structure provides clean coupling behavior versus wavelength and coupler length. Note that all elements are within a background of lower index glass 82.

Figure 8:
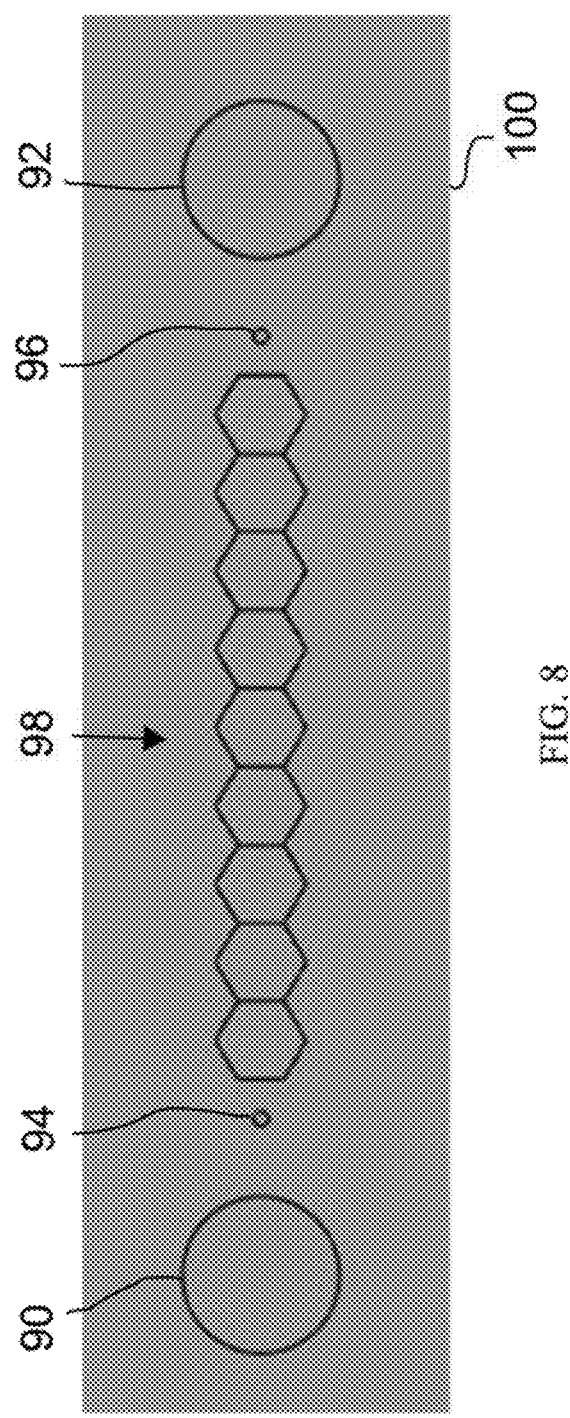
FIG. 8 shows an embodiment where the broad slab element is consistent with the stack-and-draw fabrication method.

The embodiment of FIG. 8 extends the embodiment of FIG. 7 by making the broad slab element consistent with the stack-and-draw fabrication method, as indicated by the bridge consisting of joined hexagonal elements. The figure shows the signal waveguides 90 and 92 and the bridge elements, which consist of two small dispersive waveguides 94 and 96 and further includes a hex count of 9 fibers 98 all within a background of lower index glass 100.

Figure 9:
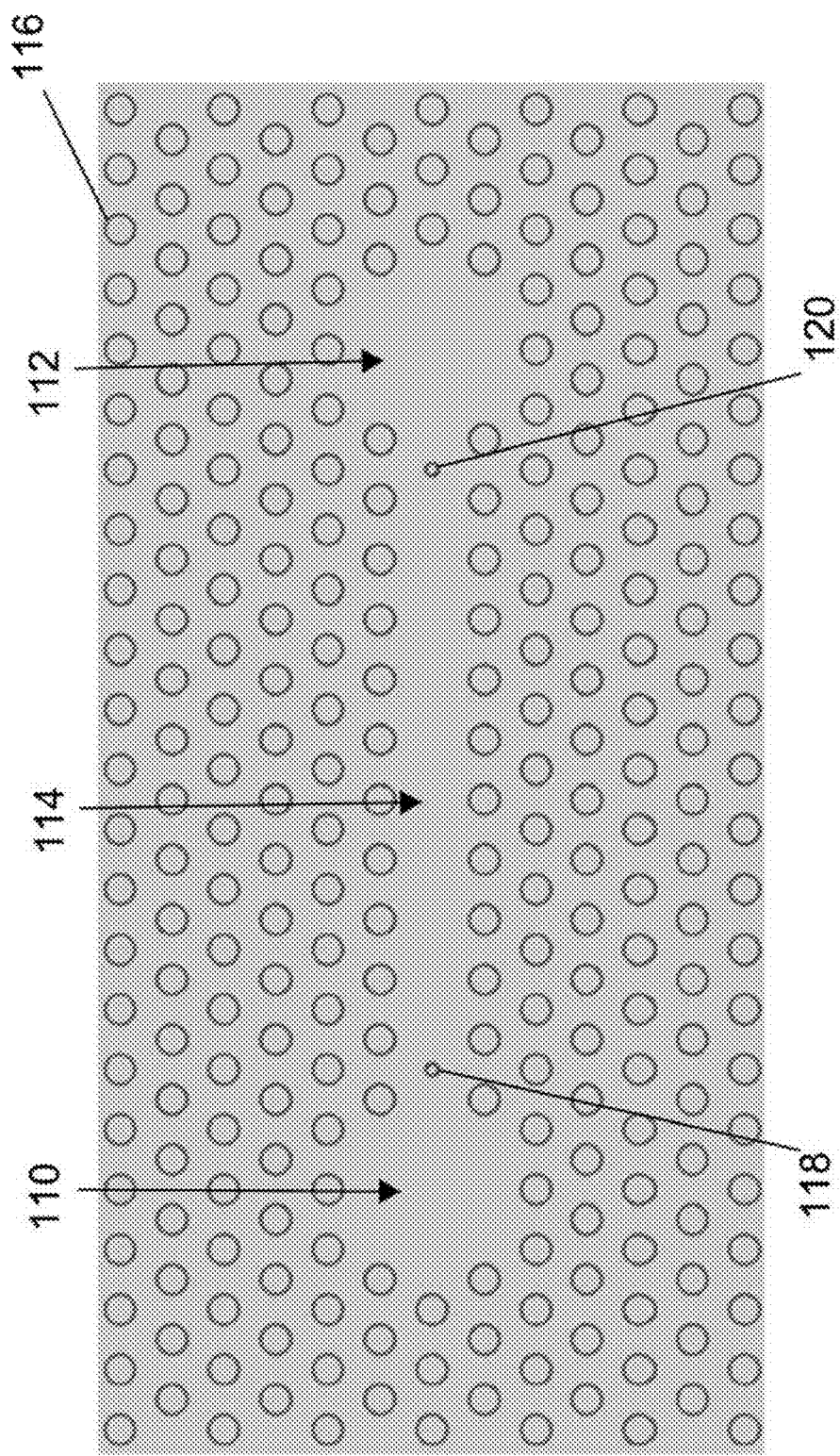
FIG. 9 shows an example of the present technology based on a photonic crystal fiber (PCF) structure.

The embodiment of FIG. 9 is an example of a photonic crystal fiber (PCF) based structure. The signal elements 110 and 112, and the broad slab bridge element, are functionally similar to those of the embodiment of FIG. 7, but are comprised of missing PCF lattice elements 116 rather than of doped silica. This has the advantage that these waveguiding elements can have a uniform refractive index of the background, typically pure fused silica. This may be desirable with respect to material fabrication. Note also that the broad slab bridge element includes portion 114 and two small dispersive elements 118 and 120.

Figure 10:
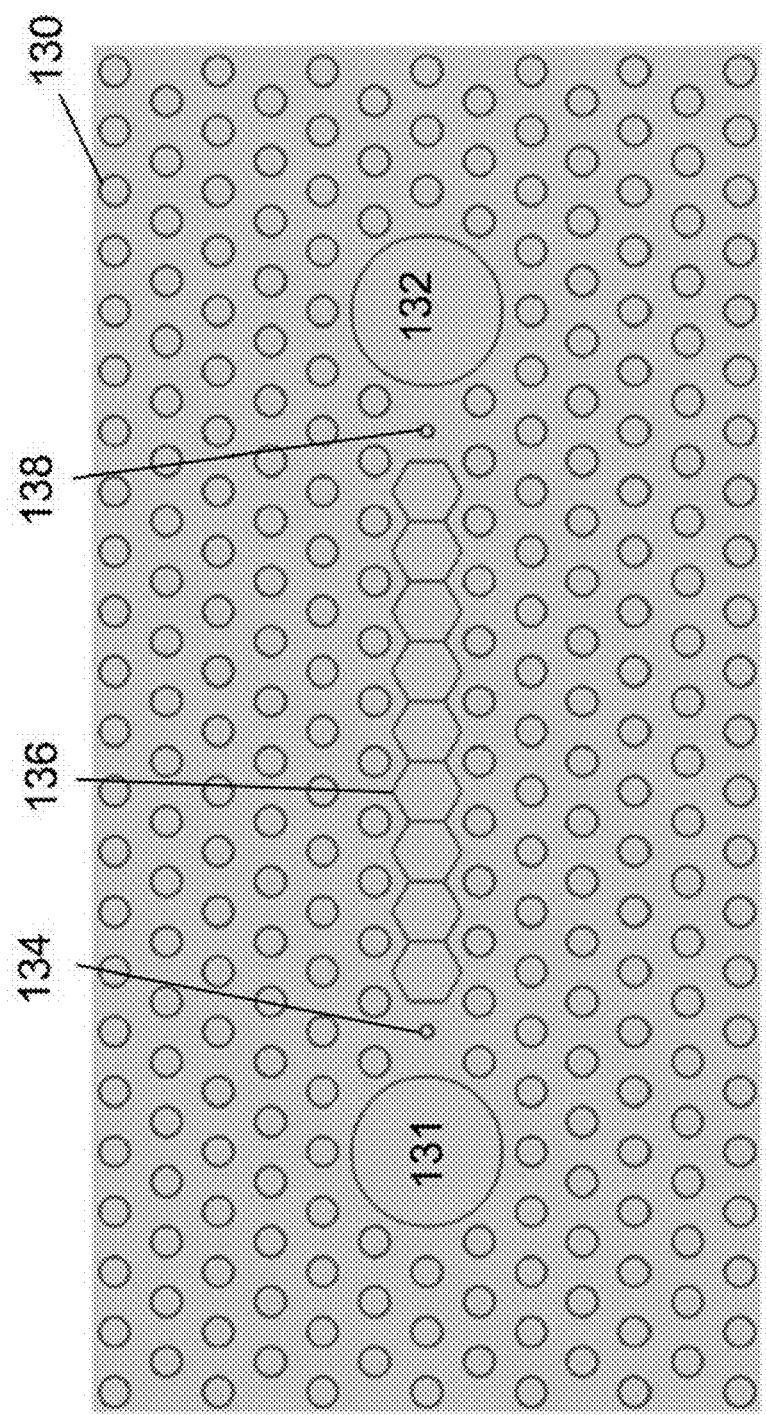
FIG. 10 shows an embodiment where signal elements and bridge slab elements have been inserted where PCF elements have been omitted.

The embodiment of FIG. 10 is similar to that of FIG. 9 except that where the PCF elements 130 have been omitted, the signal elements 131 and 132 and bridge slab elements 134, 136 and 138 have been inserted and can be optionally defined/modified by use of materials of different refractive index. Elements 134 and 138 are small dispersive elements and element 136 consists of 9 hex fibers.

Figure 11:
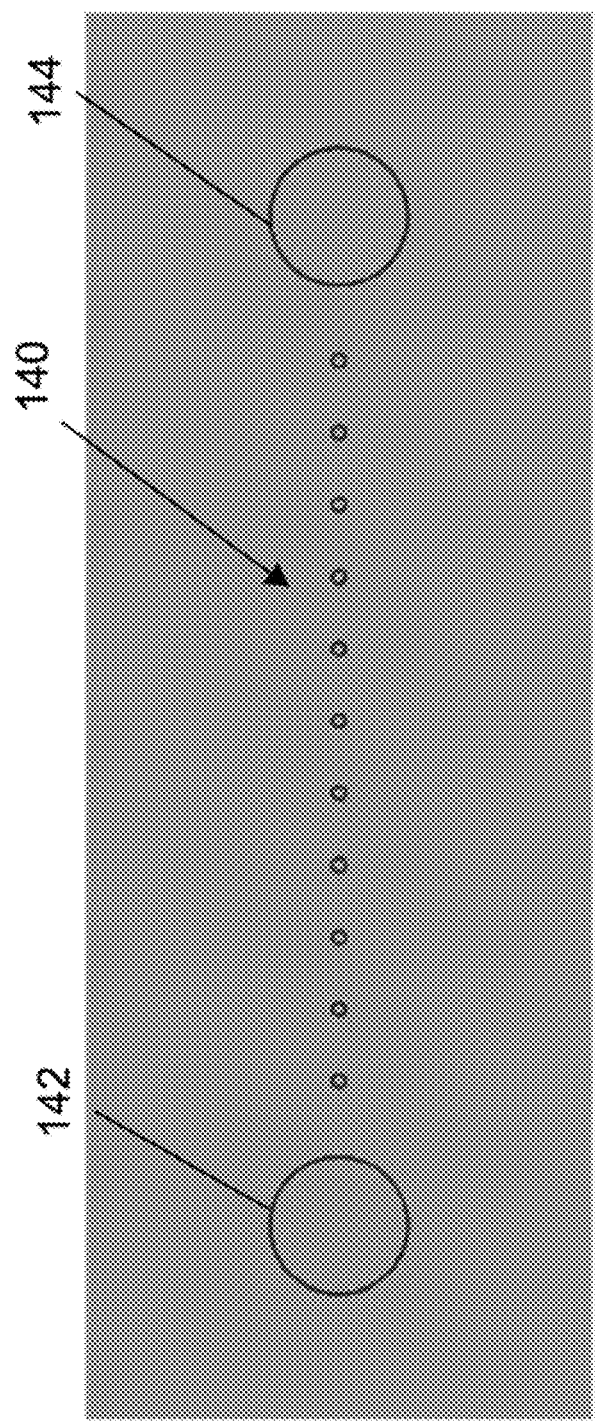
FIG. 11 illustrates an embodiment where the bridge is comprised of a string of 11 identical dispersive elements.

In the embodiment of FIG. 11, the bridge is comprised of a string of 11 identical dispersive elements 140. All elements are defined by a refractive index contrast with respect to the background; their index profiles may be uniform or tailored. In this embodiment, the bridge elements will support several narrowly spaced modes, and typically more than one of these will couple to the signal elements 142, 144 and participate in the transfer between them. This complicates the coupling behavior as compared to the embodiment of FIG. 7, which can make optimization more difficult, but it also enables desirable functionality. For instance, this embodiment provides a narrower wavelength transmission window compared to that of FIG. 7.

Figure 12:
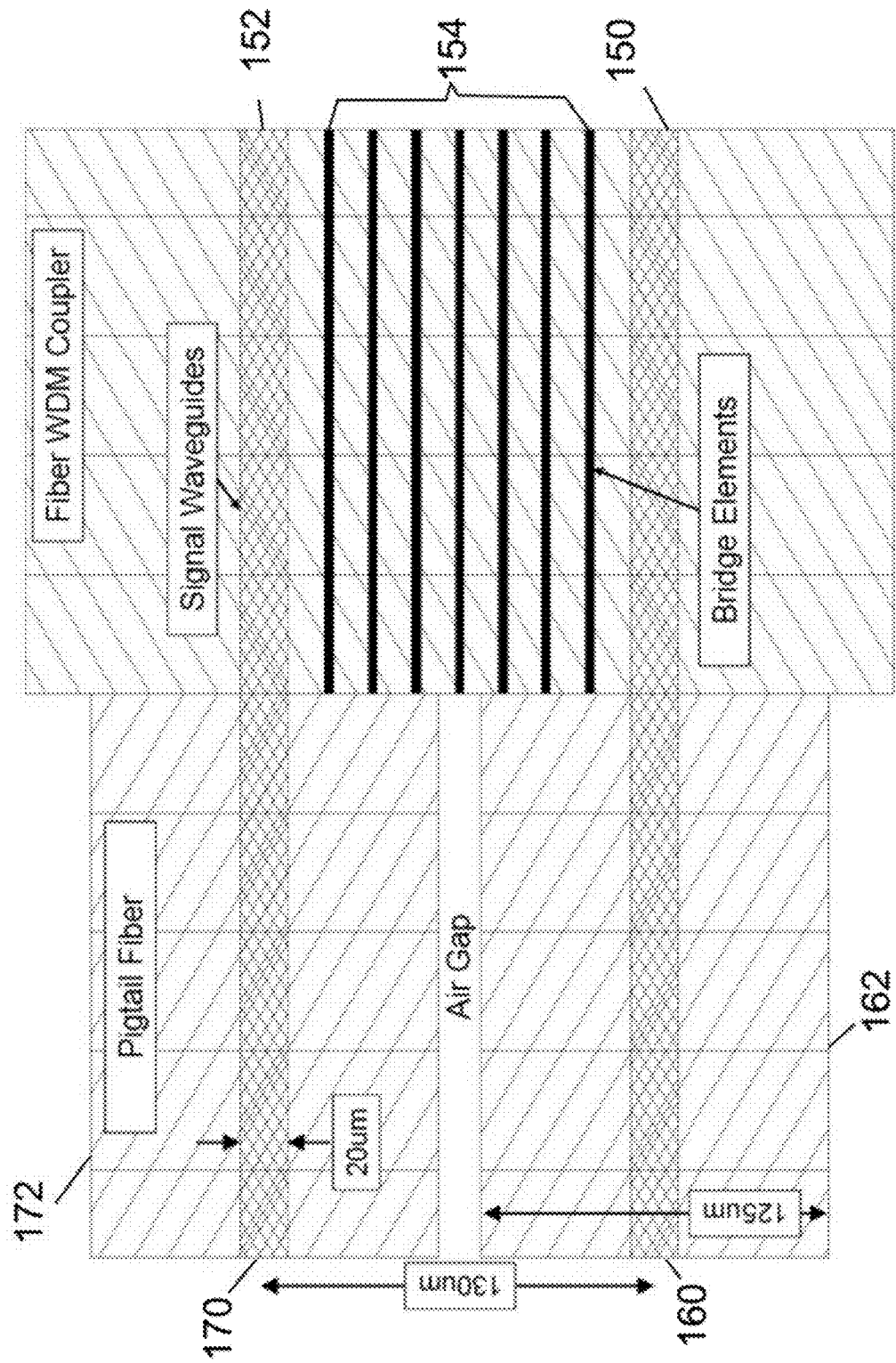
FIG. 12 illustrates a side sectional view of an embodiments of the present fiber WDM coupler where each signal waveguide is connected to a fiber pigtail

FIG. 12 illustrates a side sectional view of an embodiments of the present fiber WDM coupler where each signal waveguide is connected to a fiber pigtail. In this example, the coupler consists of two signal waveguides 150 and 152 separated by 7 bridge elements 154. The signal waveguides are 20 µm in diameter. Signal waveguide 150 is connected to fiber pigtail waveguide 160 which is also 20 µm in diameter and is located within a lower index glass 162. Signal waveguide 152 is connected to fiber pigtail waveguide 170 which is also 20 µm in diameter and is located within a lower index glass 172. Each fiber pigtail is 125 µm in diameter. The center of signal waveguides 150 and 152 are 130 µm apart, as are the pigtail waveguides 160 and 170.

An all fiber wavelength selective coupler provides wavelength selective transfer of optical energy between two or more separated waveguides. The coupler includes signal cores that are separated enough that they can be fusion spliced to standard fibers as lead-in and lead-out pigtails. A bridge between the signal cores facilitates transfer of the optical energy through a process of evanescent coupling. In one example, the bridge is formed of a series of graded index cores.

Concepts:

This writing also presents at least the following concepts:

1. An apparatus for wavelength selective transfer of optical energy, comprising:
a first signal waveguide;
a second signal waveguide located a distance from said first signal waveguide; and
a bridge between said first signal waveguide and said second signal waveguide, wherein said bridge enables indirect evanescent coupling and wavelength selective transfer of optical energy from said first signal waveguide to said second signal waveguide.

2. The apparatus of concepts 1, 3-5, 7-14 and 18-24, wherein said bridge comprises a series of step index or graded index cores between said first signal waveguide and said second signal waveguide.

3. The apparatus of concepts 1, 2 and 4-24, wherein said bridge comprises an effective index of refraction that will only allow selected wavelengths to couple from said first signal waveguide to said second signal waveguide.

4. The apparatus of concepts 1-3 and 5-24, wherein said distance sufficiently separates said first signal waveguide from said second signal waveguide such that a first fiber optic core and a second fiber optic core can be fusion spliced to said first signal waveguide and said second signal waveguide, respectively.

5. The apparatus of concepts 1-4 and 6-24, wherein said first signal waveguide is single or multimode and said second signal waveguide is single or multimode, but only one mode will be selected for transfer from said first signal waveguide to said second signal waveguide.

6. The apparatus of concepts 1, 3-5, 7-9 and 18-24, wherein said bridge comprises a slab multimode core.

7. The apparatus of concepts 1-6 and 8-24, wherein said first signal waveguide and said second signal waveguide comprise a dopant.

8. The apparatus of concept 7, wherein said dopant comprises Ge.

9. The apparatus of concepts 1-8 and 10-24, wherein said first signal waveguide and said second signal waveguide each comprise a Ge-doped step index core.

10. The apparatus of concepts 1, 3-5, 7-9, 11-14 and 18-24, wherein said bridge comprises a series of step index or graded index cores between said first signal waveguide and said second signal waveguide, wherein each core of said series comprises a graded index (GRIN) rod, wherein said series acts as a resonant bridge between said first signal waveguide and said second signal waveguide.

11. The apparatus of concept 10, wherein each said GRIN rod supports at least two modes.

12. The apparatus of concept 11, wherein the effective index of the fundamental mode in said first signal waveguide matches one of said two modes.

13. The apparatus of concepts 10-12, wherein each said GRIN rod comprises a higher dispersion than that of said first signal waveguide and said second signal waveguide.

14. The apparatus of concepts 10-13, wherein the spacing between each GRIN rod and between the set of GRIN rods and said first signal waveguide and said second signal waveguide is selected to produce a desired coupling efficiency and the length at which maximum coupling occurs.

15. The apparatus of concept 2-5, 7-14, 16 and 18-24, wherein each core of said series of step index or graded index cores is closer to its closest core of said series than said first signal waveguide is to its closest core of said series and wherein each core of said series of step index or graded index cores is closer to its closest core of said series than said second signal waveguide is to its closest core of said series.

16. The apparatus of concepts 2-5, 7-15 and 18-24, wherein the space between said first signal waveguide and its closest core of said series of step index or graded index cores is selected to determine a desired transfer speed of said optical energy from said first signal waveguide to said bridge and wherein the space between said second signal waveguide and its closest core of said of said series of step index or graded index cores is selected to determine a desired transfer speed of said optical energy from said bridge to said second signal waveguide.

17. The apparatus of concepts 1, 3-9 and 18-24, wherein said bridge further comprises a first high dispersion GRIN and a second high dispersion GRIN, wherein said first high dispersion GRIN is located between said slab and said first signal waveguide and wherein said second high dispersion GRIN is located between said slab and said second signal waveguide.

18. The apparatus of concepts 1-17, further comprising at least one additional signal waveguide, wherein each additional signal waveguide is located a predetermined distance from said first signal waveguide, wherein said predetermined distance disables direct evanescent coupling and wavelength selective transfer of optical energy from said first signal waveguide to said additional signal waveguides, wherein said apparatus further comprises at least one additional bridge between said first signal waveguide and said at least one additional signal waveguide, wherein said at least one additional bridge enables indirect evanescent coupling and wavelength selective transfer of optical energy from said first signal waveguide to each said at least one additional signal waveguide.

19. The apparatus of concepts 18 and 21-24, wherein each waveguide of said at least one additional signal waveguide is optimized for at least one of a specific wavelength and a specific polarization.

20. The apparatus of concept 18, wherein each waveguide of said at least one additional signal waveguide is optimized for a different specific wavelength.

21. The apparatus of concepts 1-20 and 22-24, wherein said first signal waveguide and said second signal waveguide have a diameter that is the same or different.

22. The apparatus of concepts 1-21 and 23-24, wherein either or both of said first signal waveguide and said second signal waveguide can be single mode or multimode.

23. The apparatus of concepts 1-22 and 24, wherein said distance is as far apart as the diameter of the fibers that will be used as pigtails.

24. The apparatus of concepts 1-23, wherein said bridge is dispersive enough that there is differentiation of the net coupling of said optical energy from said first signal waveguide to said second signal waveguide at one or more desired wavelengths.

25. The apparatus of concept 1, wherein said distance is too far to allow direct evanescent coupling and wavelength selective transfer of optical energy from said first signal waveguide to said second signal waveguide.

26. The apparatus of concept 1, wherein said distance is far enough such that said indirect evanescent coupling between said first signal waveguide and said second signal waveguide is greater with the inclusion of said bridge than direct evanescent coupling between said first signal waveguide and said second signal waveguide is without the inclusion of said bridge.

27. The apparatus of concept 1, wherein said distance is far enough such that said indirect evanescent coupling between said first signal waveguide and said second signal waveguide is greater with the inclusion of said bridge between said first signal waveguide and said second signal waveguide than direct evanescent coupling would be without the inclusion of said bridge between said first signal waveguide and said second signal waveguide All elements, parts and steps described herein are preferably included. It is to be understood that any of these elements, parts and steps may be replaced by other elements, parts and steps or deleted altogether as will be obvious to those skilled in the art based on the teachings herein.

The foregoing description of the present technology has been presented for purposes of illustration and description and is not intended to be exhaustive or to limit the present technology to the precise form disclosed. Many modifications and variations are possible in light of the above teaching. The embodiments disclosed were meant only to explain the principles of the present technology and its practical application to thereby enable others skilled in the art to best use the invention in various embodiments and with various modifications suited to the particular use contemplated. The scope of the present technology is to be defined by the following claims.

We claim:

1. An apparatus for wavelength selective transfer of optical energy, comprising:
   a first signal waveguide;
   a second signal waveguide located a distance from said first signal waveguide;
   a bridge comprising at least one waveguiding element between said first signal waveguide and said second signal waveguide, wherein said bridge enables indirect evanescent coupling and wavelength selective transfer of optical energy from said first signal waveguide to said second signal waveguide; and
   a monolithic glass structure, wherein said first signal waveguide, said second signal waveguide and said bridge are embedded within said monolithic glass structure, and wherein said monolithic glass structure comprises a body of a fiber.

2. The apparatus of claim 1, wherein said bridge comprises a series of step index or graded index cores between said first signal waveguide and said second signal waveguide.

3. The apparatus of claim 1, wherein said bridge comprises an effective index of refraction that will only allow selected wavelengths to couple from said first signal waveguide to said second signal waveguide.

4. The apparatus of claim 1, wherein said distance sufficiently separates said first signal waveguide from said second signal waveguide such that a first fiber optic core and a second fiber optic core can be fusion spliced to said first signal waveguide and said second signal waveguide, respectively.

5. The apparatus of claim 1, wherein said first signal waveguide is single or multimode and said second signal waveguide is single or multimode, but only one mode will be selected for transfer from said first signal waveguide to said second signal waveguide.

6. The apparatus of claim 1, wherein said bridge comprises a large slab multimode core.

7. The apparatus of claim 1, wherein said first signal waveguide and said second signal waveguide comprise a dopant.

8. The apparatus of claim 7, wherein said dopant comprises Ge.

9. The apparatus of claim 1, wherein said first signal waveguide and said second signal waveguide each comprise a Ge-doped step index core.

10. The apparatus of claim 1, wherein said bridge comprises a series of step index or graded index cores between said first signal waveguide and said second signal waveguide, wherein each core of said series comprises a graded index (GRIN) rod, wherein said series acts as a resonant bridge between said first signal waveguide and said second signal waveguide.

11. The apparatus of claim 10, wherein each said GRIN rod supports at least two modes.

12. The apparatus of claim 11, wherein the effective index of the fundamental mode in said first signal waveguide matches one of said two modes.

13. The apparatus of claim 12, wherein each said GRIN rod comprises a higher dispersion than that of said first signal waveguide and said second signal waveguide.

14. The apparatus of claim 13, wherein the spacing between each GRIN rod and between the set of GRIN rods and said first signal waveguide and said second signal waveguide is selected to produce a desired coupling efficiency and the length at which maximum coupling occurs.

15. The apparatus of claim 2, wherein each core of said series of step index or graded index cores is closer to its closest core of said series than said first signal waveguide is to its closest core of said series and wherein each core of said series of step index or graded index cores is closer to its closest core of said series than said second signal waveguide is to its closest core of said series.

16. The apparatus of claim 2, wherein the space between said first signal waveguide and its closest core of said series of step index or graded index cores is selected to determine a desired transfer speed of said optical energy from said first signal waveguide to said bridge and wherein the space between said second signal waveguide and its closest core of said series of step index or graded index cores is selected to determine a desired transfer speed of said optical energy from said bridge to said second signal waveguide.

17. The apparatus of claim 6, wherein said bridge further comprises a first high dispersion GRIN and a second high dispersion GRIN, wherein said first high dispersion GRIN is located between said slab and said first signal waveguide and wherein said second high dispersion GRIN is located between said slab and said second signal waveguide.

18. The apparatus of claim 1, further comprising at least one additional signal waveguide, wherein each additional signal waveguide is located a predetermined distance from said first signal waveguide, wherein said predetermined distance disables direct evanescent coupling and wavelength selective transfer of optical energy from said first signal waveguide to said additional signal waveguides, wherein said apparatus further comprises at least one additional bridge between said first signal waveguide and said at least one additional signal waveguide, wherein said at least one additional bridge enables indirect evanescent coupling and wavelength selective transfer of optical energy from said first signal waveguide to each said at least one additional signal waveguide.

19. The apparatus of claim 18, wherein each waveguide of said at least one additional signal waveguide is optimized for at least one of a specific wavelength and a specific polarization.

20. The apparatus of claim 18, wherein each waveguide of said at least one additional signal waveguide is optimized for a different specific wavelength.

21. The apparatus of claim 1, wherein said first signal waveguide and said second signal waveguide have a diameter that is the same or different.

22. The apparatus of claim 1, wherein either or both of said first signal waveguide and said second signal waveguide can be single mode or multimode.

23. The apparatus of claim 1, wherein said distance is as far apart as the diameter of the fibers that will be used as pigtails.

24. The apparatus of claim 1, wherein said bridge is dispersive enough that there is differentiation of the net coupling of said optical energy from said first signal waveguide to said second signal waveguide at one or more desired wavelengths.

25. The apparatus of claim 1, wherein said distance is too far to allow direct evanescent coupling and wavelength selective transfer of optical energy from said first signal waveguide to said second signal waveguide.

26. The apparatus of claim 1, wherein said distance is far enough such that said indirect evanescent coupling between said first signal waveguide and said second signal waveguide is greater with the inclusion of said bridge than direct evanescent coupling between said first signal waveguide and said second signal waveguide is at said distance without the inclusion of said bridge.

27. The apparatus of claim 1, wherein said distance is far enough such that said indirect evanescent coupling between said first signal waveguide and said second signal waveguide is greater with the inclusion of said bridge between said first signal waveguide and said second signal waveguide than direct evanescent coupling would be without the inclusion of said bridge between said first signal waveguide and said second signal waveguide.

28. The apparatus of claim 1, wherein said first signal waveguide, said second signal waveguide and said at least one waveguiding element are parallel one to another and their relative positions one to another are invariant along the length of said apparatus.

29. An apparatus for wavelength selective transfer of optical energy, comprising:
 a first signal waveguide;
 a second signal waveguide located a distance from said first signal waveguide;
 a bridge comprising at least one waveguiding element between said first signal waveguide and said second signal waveguide, wherein said bridge enables indirect evanescent coupling and wavelength selective transfer of optical energy from said first signal waveguide to said second signal waveguide; and
 a monolithic glass structure, wherein said first signal waveguide, said second signal waveguide and said bridge are embedded within said monolithic glass structure, and wherein said first signal waveguide, said second signal waveguide and said at least one waveguiding element are parallel one to another and their relative positions one to another are invariant along the length of said apparatus.

30. The apparatus of claim 29, wherein said bridge comprises a series of step index or graded index cores between said first signal waveguide and said second signal waveguide.

31. The apparatus of claim 29, wherein said bridge comprises an effective index of refraction that will only allow selected wavelengths to couple from said first signal waveguide to said second signal waveguide.

32. The apparatus of claim 29, wherein said distance sufficiently separates said first signal waveguide from said second signal waveguide such that a first fiber optic core and a second fiber optic core can be fusion spliced to said first signal waveguide and said second signal waveguide, respectively.

33. The apparatus of claim 29, wherein said first signal waveguide is single or multimode and said second signal waveguide is single or multimode, but only one mode will be selected for transfer from said first signal waveguide to said second signal waveguide.

34. The apparatus of claim 29, wherein said bridge comprises a large slab multimode core.

35. The apparatus of claim 29, wherein said first signal waveguide and said second signal waveguide comprise a dopant.

36. The apparatus of claim 35, wherein said dopant comprises Ge.

37. The apparatus of claim 29, wherein said first signal waveguide and said second signal waveguide each comprise a Ge-doped step index core.

38. The apparatus of claim 29, wherein said bridge comprises a series of step index or graded index cores between said first signal waveguide and said second signal waveguide, wherein each core of said series comprises a graded index (GRIN) rod, wherein said series acts as a resonant bridge between said first signal waveguide and said second signal waveguide.

39. The apparatus of claim 38, wherein each said GRIN rod supports at least two modes.

40. The apparatus of claim 39, wherein the effective index of the fundamental mode in said first signal waveguide matches one of said two modes.

41. The apparatus of claim 40, wherein each said GRIN rod comprises a higher dispersion than that of said first signal waveguide and said second signal waveguide.

42. The apparatus of claim 41, wherein the spacing between each GRIN rod and between the set of GRIN rods and said first signal waveguide and said second signal waveguide is selected to produce a desired coupling efficiency and the length at which maximum coupling occurs.

43. The apparatus of claim 30, wherein each core of said series of step index or graded index cores is closer to its closest core of said series than said first signal waveguide is to its closest core of said series and wherein each core of said series of step index or graded index cores is closer to its closest core of said series than said second signal waveguide is to its closest core of said series.

44. The apparatus of claim 30, wherein the space between said first signal waveguide and its closest core of said series of step index or graded index cores is selected to determine a desired transfer speed of said optical energy from said first signal waveguide to said bridge and wherein the space between said second signal waveguide and its closest core of said series of step index or graded index cores is selected to determine a desired transfer speed of said optical energy from said bridge to said second signal waveguide.

45. The apparatus of claim 34, wherein said bridge further comprises a first high dispersion GRIN and a second high dispersion GRIN, wherein said first high dispersion GRIN is located between said slab and said first signal waveguide and wherein said second high dispersion GRIN is located between said slab and said second signal waveguide.

46. The apparatus of claim 29, further comprising at least one additional signal waveguide, wherein each additional signal waveguide is located a predetermined distance from said first signal waveguide, wherein said predetermined distance disables direct evanescent coupling and wavelength selective transfer of optical energy from said first signal waveguide to said additional signal waveguides, wherein said apparatus further comprises at least one additional bridge between said first signal waveguide and said at least one additional signal waveguide, wherein said at least one additional bridge enables indirect evanescent coupling and wavelength selective transfer of optical energy from said first signal waveguide to each said at least one additional signal waveguide.

47. The apparatus of claim 46, wherein each waveguide of said at least one additional signal waveguide is optimized for at least one of a specific wavelength and a specific polarization.

48. The apparatus of claim 46, wherein each waveguide of said at least one additional signal waveguide is optimized for a different specific wavelength.

49. The apparatus of claim 29, wherein said first signal waveguide and said second signal waveguide have a diameter that is the same or different.

50. The apparatus of claim 29, wherein either or both of said first signal waveguide and said second signal waveguide can be single mode or multimode.

51. The apparatus of claim 29, wherein said distance is as far apart as the diameter of the fibers that will be used as pigtails.

52. The apparatus of claim 29, wherein said bridge is dispersive enough that there is differentiation of the net coupling of said optical energy from said first signal waveguide to said second signal waveguide at one or more desired wavelengths.

53. The apparatus of claim 29, wherein said distance is too far to allow direct evanescent coupling and wavelength selective transfer of optical energy from said first signal waveguide to said second signal waveguide.

54. The apparatus of claim 29, wherein said distance is far enough such that said indirect evanescent coupling between said first signal waveguide and said second signal waveguide is greater with the inclusion of said bridge than direct evanescent coupling between said first signal waveguide and said second signal waveguide is at said distance without the inclusion of said bridge.

55. The apparatus of claim 29, wherein said distance is far enough such that said indirect evanescent coupling between said first signal waveguide and said second signal waveguide is greater with the inclusion of said bridge between said first signal waveguide and said second signal waveguide than direct evanescent coupling would be without the inclusion of said bridge between said first signal waveguide and said second signal waveguide.

* * * * *